US012702999B2

(12) United States Patent
Akashi et al.

(10) Patent No.: US 12,702,999 B2
(45) Date of Patent: Aug. 11, 2026

(54) APPLICATION APPARATUS AND APPLICATION METHOD

(71) Applicants: OSAKA UNIVERSITY, Suita (JP); NTN Corporation, Osaka (JP)

(72) Inventors: Mitsuru Akashi, Suita (JP); Takami Akagi, Suita (JP); Atsushi Oda, Iwata (JP); Shohei Chikae, Iwata (JP); Haruka Nakamura, Iwata (JP)

(73) Assignees: OSAKA UNIVERSITY, Osaka (JP); NTN Corporation, Osaka (JP)

( * ) Notice: Subject to any disclaimer, the term of this patent is extended or adjusted under 35 U.S.C. 154(b) by 322 days.

(21) Appl. No.: 17/642,122

(22) PCT Filed: Sep. 4, 2020

(86) PCT No.: PCT/JP2020/033645
§ 371 (c)(1),
(2) Date: Mar. 10, 2022

(87) PCT Pub. No.: WO2021/049436
PCT Pub. Date: Mar. 18, 2021

(65) Prior Publication Data

US 2022/0371043 A1 Nov. 24, 2022

(30) Foreign Application Priority Data

Sep. 12, 2019 (JP) ................................ 2019-166320
Sep. 12, 2019 (JP) ................................ 2019-166450

(51) Int. Cl.
*B05C 5/02* (2006.01)
*B05C 11/10* (2006.01)
(Continued)

(52) U.S. Cl.
CPC .......... *B05C 5/0225* (2013.01); *B05C 5/0291* (2013.01); *B05C 11/1002* (2013.01); *B05C 13/00* (2013.01); *B05D 1/26* (2013.01)

(58) Field of Classification Search
None
See application file for complete search history.

(56) References Cited

U.S. PATENT DOCUMENTS 8,756,827 B1 * 6/2014 Calabro .................. B05B 16/60 454/238
2006/0023299 A1 2/2006 Muraki
(Continued)

FOREIGN PATENT DOCUMENTS

CN 108290176 A 7/2018
JP S48-112896 U 12/1973
(Continued)

OTHER PUBLICATIONS

Espacenet English translation of JP2007094341.*
(Continued)

*Primary Examiner* — Charles Capozzi
(74) *Attorney, Agent, or Firm* — Rimon P.C.

(57) ABSTRACT

An application apparatus includes: an application needle that applies, to a target, an application material having its viscosity changing under shear; a drive unit that moves the application needle up and down; and a controller that controls the drive unit to move the application needle such that shear is applied to the application material at a shear speed depending on a type of the application material and depending on a target application amount or a target application diameter.

22 Claims, 17 Drawing Sheets

(A) (B)

(51) Int. Cl.
*B05C 13/00* (2006.01)
*B05D 1/26* (2006.01)

(56) References Cited

U.S. PATENT DOCUMENTS

| | | | |
|---|---|---|---|
| 2006/0029740 A1 | 2/2006 | Sakurai et al. | |
| 2007/0234952 A1* | 10/2007 | Kojima | H01L 21/02 118/305 |
| 2010/0129849 A1 | 5/2010 | Kiyota et al. | |
| 2010/0151115 A1* | 6/2010 | McBrady | B05D 1/02 118/58 |
| 2010/0304428 A1 | 12/2010 | Nomoto et al. | |
| 2018/0359861 A1 | 12/2018 | Yamanaka | |
| 2019/0262856 A1 | 8/2019 | Itou et al. | |
| 2020/0263119 A1 | 8/2020 | Akashi et al. | |

FOREIGN PATENT DOCUMENTS

| | | | |
|---|---|---|---|
| JP | H04-35857 | A | 2/1992 |
| JP | H07-308616 | A | 11/1995 |
| JP | 2004-317189 | A | 11/2004 |
| JP | 2006-025789 | A | 2/2006 |
| JP | 2006-026463 | A | 2/2006 |
| JP | 2007-094341 | A | 4/2007 |
| JP | 2007-132912 | A | 5/2007 |
| JP | 2007-268353 | A | 10/2007 |
| JP | 2008-191091 | A | 8/2008 |
| JP | 2010-115577 | A | 5/2010 |
| JP | 2010-273655 | A | 12/2010 |
| JP | 2011-229409 | A | 11/2011 |
| JP | 2011-243188 | A | 12/2011 |
| JP | 2017-094286 | A | 6/2017 |
| WO | 2009/001759 | A1 | 12/2008 |
| WO | 2015/087898 | A1 | 6/2015 |
| WO | WO2017090381 | * | 1/2017 |
| WO | 2019/088224 | A1 | 5/2019 |

OTHER PUBLICATIONS

Espacenet translation of JPH07308616 (year of translation: 2025).*
International Search Report issued in corresponding International Application No. PCT/JP2020/033645, dated Nov. 2, 2020 w/English Translation.
Notice of Reasons for Refusal issued in corresponding Japanese Patent Application No. 2019-166320, dated Jan. 16, 2024.
Masaaki Ebata, "Basic Theory and Evaluation of Physical Properties of Coatings and Films", Journal of the Japan Society of Colour Material, Jun. 20, 2018, vol. 91, No. 6, pp. 206-211, with translation of English abstract.

* cited by examiner

| APPLICATION MATERIAL | TARGET APPLICATION AMOUNT | MOVING SPEED OF APPLICATION NEEDLE IN VERTICALLY DOWNWARD DIRECTION |
|---|---|---|
| a1 | b1 | v1 |
| a1 | b2 | v2 |
| a1 | b3 | v3 |
| a1 | b4 | v4 |
| a2 | b1 | v5 |
| a2 | b2 | v6 |
| a2 | b3 | v7 |
| a2 | b4 | v8 |
| ⋮ | ⋮ | ⋮ |

| APPLICATION MATERIAL | TARGET APPLICATION AMOUNT | DISTANCE BETWEEN APPLICATION NEEDLE AND OUTER WALL OF THROUGH HOLE | MOVING SPEED OF APPLICATION NEEDLE IN VERTICALLY DOWNWARD DIRECTION |
|---|---|---|---|
| a1 | b1 | c1 | v1 |
| a1 | b1 | c2 | v2 |
| a1 | b1 | c3 | v3 |
| a1 | b1 | c4 | v4 |
| a1 | b2 | c1 | v5 |
| a1 | b2 | c2 | v6 |
| a1 | b2 | c3 | v7 |
| a1 | b2 | c4 | v8 |
| ⋮ | ⋮ | ⋮ | ⋮ |

| APPLICATION MATERIAL | TARGET APPLICATION DIAMETER | MOVING SPEED OF APPLICATION NEEDLE IN VERTICALLY DOWNWARD DIRECTION |
|---|---|---|
| a1 | e1 | v1 |
| a1 | e2 | v2 |
| a1 | e3 | v3 |
| a1 | e4 | v4 |
| a2 | e1 | v5 |
| a2 | e2 | v6 |
| a2 | e3 | v7 |
| a2 | e4 | v8 |
| ⋮ | ⋮ | ⋮ |

FIG.16

| APPLICATION MATERIAL | TARGET APPLICATION DIAMETER | DISTANCE BETWEEN APPLICATION NEEDLE AND OUTER WALL OF THROUGH HOLE | MOVING SPEED OF APPLICATION NEEDLE IN VERTICALLY DOWNWARD DIRECTION |
|---|---|---|---|
| a1 | e1 | c1 | v1 |
| a1 | e1 | c2 | v2 |
| a1 | e1 | c3 | v3 |
| a1 | e1 | c4 | v4 |
| a1 | e2 | c1 | v5 |
| a1 | e2 | c2 | v6 |
| a1 | e2 | c3 | v7 |
| a1 | e2 | c4 | v8 |
| ⋮ | ⋮ | ⋮ | ⋮ |

APPLICATION APPARATUS AND APPLICATION METHOD

CROSS REFERENCE TO RELATED APPLICATIONS

This application is the U.S. National Phase under 35 U.S.C. § 371 of International Application No. PCT/JP2020/033645, filed on Sep. 4, 2020, which claims the benefit of Japanese Application No. 2019-166320, filed on Sep. 12, 2019 and Japanese Application No. 2019-166450, filed Sep. 12, 2019, the entire contents of each are hereby incorporated by reference.

TECHNICAL FIELD

The present disclosure relates to an application apparatus and an application method, and particularly relates to an application apparatus and an application method for applying, by means of an application needle, an application material (liquid material) to a target.

BACKGROUND ART

In recent years, the printed electronics technology for forming a miniature circuit such as RFID (Radio Frequency Tdentifier) tag through rendering with a printing (application) method has rapidly been developed. While the inkjet method, the dispenser method, and the like are common methods for forming miniature circuit patterns or electrode patterns, a method using an application needle has conic to attention for its capability of finely applying materials of a wide range of viscosities.

Japanese Patent Laying-Open No. 2007-268353 (PTL 1) discloses a method of finely applying a liquid material using an application unit. Such an application unit is intended to repair defects of a miniature pattern, and capable of finely applying application materials of a wide range of viscosities. In an application operation, one application needle is protruded from a through hole formed in the bottom of an application material container holding an application material. The application material adhering to the tip of the application needle is brought into contact with a target to thereby apply the material to the target.

Japanese Patent Laying-Open No. 17104-035857 (PTL 2) discloses a method for applying a non-Newtonian fluid using an application needle method. Specifically, PTL 2 discloses that, when a constant amount of an adhesive that is a non-Newtonian fluid is applied under viscosity change of the adhesive, the depth for which an application pin sinks is changed. PTL 2 discloses that, to increase or decrease the amount of application, the time for which an application needle is immersed in the adhesive, the time for which the application needle transfers a material onto a target, or the diameter of the application needle is changed. Japanese Patent Laying-Open No. H04-035857 (PTL 2) also discloses that the initial viscosity of the adhesive and a change of the viscosity with time are measured to cause these measurements to be reflected on the depth for which the application needle is immersed in the adhesive, the time for transfer, and the time for immersion.

Recently, it is known that a microarray in which a physiologically active substance such as protein and DNA is finely arranged enables a variety of inspections and tests to be conducted quickly with a small amount of samples. It is also known that, cells during cell culture differ from each other in terms of protein expression, depending on local contact between a cell and surrounding cells and the shape of an aggregation of cells, for example. Studies have therefore been conducted actively on difference in protein expression depending on the shape of an aggregation of cells. Specifically, a cell adhesion protein is patterned in various shapes on the bottom surface of a culture container. Studies are also being conducted on the cellular tissue forming technology. Specifically, a gel agent in which cells are dispersed is patterned.

The so-called inkjet method and the so-called dispenser method, for example, are commonly known as a method for patterning protein and gel agent. The method using an application needle, however, has also come to attention, since the application needle method can finely apply materials of a wide range of viscosities. A technique for finely applying an application liquid using an application needle is disclosed for example in Japanese Patent Laying-Open No. 2007-268353 (PTL 1) and Japanese Patent Laying-Open No. 2017-094286 (PTL 3), for example. The technique disclosed in these documents mainly aims to repair defects of a miniature pattern.

Particularly for a microarrayer forming an array of protein spots, it is necessary to adjust the humidity of the environment in which the array is formed, depending on the properties of a solution in which protein is dissolved. For example, Japanese Patent Laying-Open No. 2007-132912 (PTL4) discloses a protein microarrayer adjusting the humidity of an environment in which an array is formed, to a humidity of 30% or more and 65% or less. Japanese Patent Laying-Open No. 2007-132912 (PTL 4) and Japanese Patent Laying-Open No. 2004-317189 (PTL 5) disclose an arrayer having a plurality of application needles.

CITATION LIST

Patent Literature

PTL 1: Japanese Patent Laying-Open No. 2007-268353
PTL 2: Japanese Patent Laying-Open No. H04-035857
PTL 3: Japanese Patent Laying-Open No. 2017-094286
PTL 4: Japanese Patent Laying-Open No. 2007-132912
PTL 5: Japanese Patent Laying-Open No. 2004-317189

SUMMARY OF INVENTION

Technical Problem

While Japanese Patent Laying-Open No. H04-035857 (PTL 2) discloses adjustment of the amount of a non-Newtonian fluid applied with an application needle, the step of wiping the adjusting application needle is included, which results in increase of the work time. Moreover, the time for immersion and the time for transfer are controlled, which may further increase the time for application. As a result, the surface of the adhesive is dried. In addition, a set-up change becomes required due to change of the diameter of the application needle.

A microarrayer may use an application apparatus with a single application needle. This is based on the aim of reducing variation of the amount of application, relative to an application apparatus using a plurality of application needles as disclosed in Japanese Patent Laying-Open Nos. 2007-132912 (PTL 5) and 2004-317189 (PTL 6), In this case, however, the amount of liquid applied per application operation is smaller than that of the application apparatus disclosed in Japanese Patent Laying-Open No. 2004-317189 (PTL 6) using a plurality of application needles, for example. The smaller the amount of the applied liquid, the higher the speed of evaporation of moisture in the applied liquid. This requires humidity control with higher precision, higher humidifying ability, and better response. In the case of the apparatus having a humidity adjustment range on the order of 30% or more and 65% or less as disclosed in Japanese Patent Laying-Open No. 2007-132912 (PTL 5), the applied liquid is disadvantageously dried quickly.

In particular, a water-soluble two-liquid mixture gel agent undergoes a considerable change of its condition such as gel hardness determined by the concentration when the gel agent is applied. In order to suppress such a variation of the condition, it is necessary to prevent as much as possible evaporation of moisture in the liquid applied first time. In view of this, it is necessary to keep the humidity around an application unit as high as possible. Not only for the two-liquid mixture gel agent, but also for a gel agent applied only once, it is necessary to reduce as much as possible variation of the diameter of the applied liquid such as gel agent.

An object of the present disclosure is therefore to provide an application apparatus and an application method that can prevent the time required for applying a non-Newtonian fluid from being increased.

Another object of the present disclosure is to provide an application apparatus capable of keeping a high humidity around an application unit.

Solution to Problem

According to the present disclosure, an application apparatus includes: an application needle that applies, to a target, an application material having viscosity changing under shear; a drive unit that moves the application needle up and down; and a controller that controls the drive unit to move the application needle such that shear is applied to the application material at a shear speed depending on a type of the application material and depending on a target application amount or a target application diameter.

Preferably, the application apparatus includes a container that holds the application material and has, in its bottom facing the target, a through hole allowing the application needle to protrude from the through hole. The controller controls the drive unit to move the application needle such that shear is applied to the application material at the shear speed when the application needle passes through the thorough hole.

Preferably, based on the type of the application material and based on the target application amount or the target application diameter, the controller determines a moving speed of the application needle in a vertically downward direction, and controls the application needle such that the application needle passes through the through hole at the determined moving speed.

Preferably, based on the type of the application material, based on the target application amount or the target application diameter, and based on a distance between the application needle and an outer wall of the through hole when the application needle protrudes through the through hole, the controller determines a moving speed of the application needle in a vertically downward direction, and controls the application needle such that the application needle passes through the through hole at the determined moving speed.

Preferably, the controller has a table defining the moving speed associated with the type of the application material, with the target application amount or the target application diameter, and with the distance, and determines the moving speed by referring to the table.

Preferably, the application material is any of a pseudoplastic fluid, a dilatant fluid, and a Bingham fluid.

Preferably, for the same distance between the application needle and the outer wall of the through hole and the type of the application material that is the pseudoplastic fluid, the table defines the moving speed as being lower as the target application amount is larger.

Preferably, for the same distance between the application needle and the outer wall of the through hole and the type of the application material that is the dilatant fluid, the table defines the moving speed as being higher as the target application amount is larger.

Preferably, for the same distance between the application needle and the outer wall of the through hole and the type of the application material that is the Bingham fluid, the table defines the moving speed as being lower as the target application amount is larger when the target application amount is less than or equal to a predetermined value, and defines the moving speed as being constant regardless of the target application amount when the target application amount is more than the predetermined value.

Preferably, for the same type of the application material and for the same target application amount, the table defines the moving speed as being lower as the distance between the application needle and the outer wall of the through hole is larger.

Preferably, the application material is a cell-containing solution.

Preferably, for the same distance between the application needle and the outer wall of the through hole, the table defines the moving speed as being lower as the target application amount is larger.

According to the present disclosure, the application apparatus includes an application unit, a cover, a humidity controller, and a gas passage. The application unit includes the application needle and the drive unit and supplies the application material to a target material-to-be-processed mounted on a worktable. The cover spreads over the application unit as seen in a first direction. The humidity controller is capable of controlling a humidity in a space formed by the cover and the worktable. The air passage allows gas with controlled humidity to be supplied from the humidity controller into the space through a flow inlet formed in the cover. The cover includes a wall, and the wall surrounds the application unit in a second direction orthogonal to the first direction and in a third direction orthogonal to the first direction and the second direction. The application apparatus is capable of adjusting the humidity in the space to 80% or more.

Preferably, the application apparatus further includes a humidity sensor that measures the humidity in the space and sends a result of measuring the humidity to the humidity controller.

Preferably, the flow inlet is located opposite, in the first direction, to the worktable with respect to the application unit.

Preferably, an exhaust outlet is formed in the cover to allow gas in the space to be discharged into an outside of the space. The application unit is located, in the second direction, away from a line connecting the flow inlet to the exhaust outlet.

Preferably, the wall of the cover includes a pair of walls located at respective ends in the third direction. The flow inlet is formed in one of the pair of walls. The exhaust outlet is formed in the other of the pair of walls.

Preferably, the flow inlet and the exhaust outlet are formed to occupy the same position in the second direction.

Preferably, in the first direction, the flow inlet and the exhaust outlet are formed opposite to each other with respect to an end of the application unit, the end being located opposite to the worktable.

Preferably, the application apparatus further includes a pair of fans placed on the cover, the fans being opposite to each other in at least one of the second direction and the third direction.

Preferably, the pair of fans are located away from the flow inlet toward the worktable in the first direction.

Preferably, the pair of fans each include a surrounding portion and four legs with which the surrounding portion is attached to the cover. The four legs extend from a main surface of the surrounding portion in a direction crossing the main surface.

Preferably, the application apparatus further includes a partition located between the application unit and the flow inlet.

Preferably, the application material is a cell-containing liquid containing a gelling agent.

According to the present disclosure, an application method for an application apparatus is provided. The application apparatus includes: an application needle that applies, to a target, an application material having viscosity changing under shear; and a container that holds the application material and has, in its bottom facing the target, a through hole allowing the application needle to protrude from the through hole. The application method includes: determining a moving speed of the application needle in a vertically downward direction, based on a type of the application material, based on a target application amount or a target application diameter, and based on a distance between the application needle and an outer wall of the through hole when the application needle protrudes through the through hole; and controlling the application needle such that the application needle passes through the through hole at the determined moving speed.

Advantageous Effects of Invention

According to the present disclosure, the time required for applying a non-Newtonian fluid can be prevented from increasing. According to the present disclosure, an application apparatus capable of keeping a high humidity around the application unit can be provided.

BRIEF DESCRIPTION OF DRAWINGS

FIG. 3 shows an example speed table according to Embodiment 2.

FIG. 16 shows an example speed table according to Modification 2.

DESCRIPTION OF EMBODIMENTS

Figure 1:
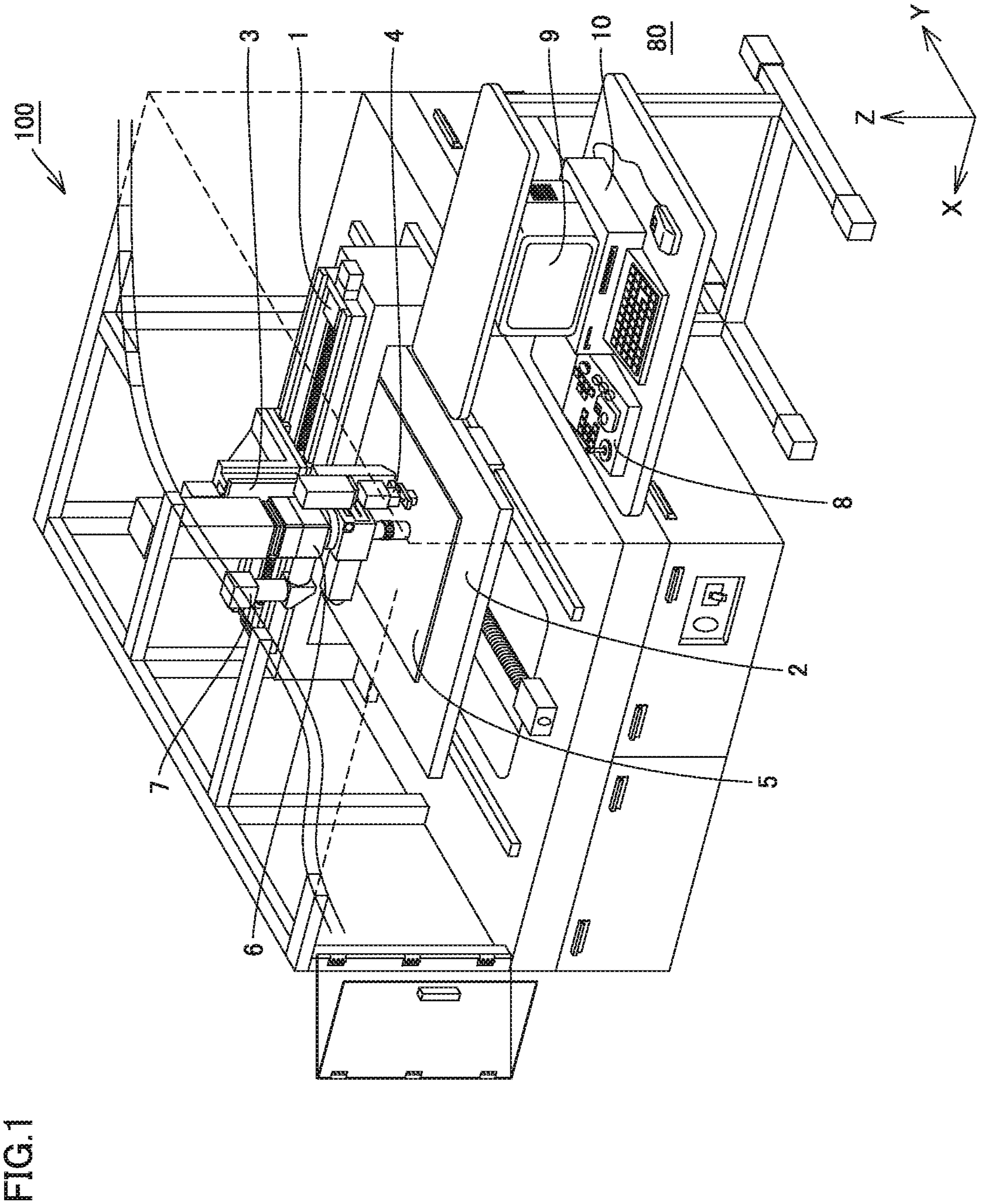
FIG. 1 is a schematic diagram of an application apparatus according to an embodiment.

Embodiments are described hereinafter based on the drawings, in the following drawings, the same or corresponding parts are denoted by the same reference numerals, and a description thereof is not herein repeated. For the sake of convenience of description, the X direction, the Y direction, and the X direction are used.

Embodiment 1

Overall Configuration of Application Apparatus

FIG. 1 is a schematic diagram of an application apparatus according to an embodiment. Referring to FIG. 1, the application apparatus includes: a process chamber; a Y-axis worktable 2, an X-axis worktable 1, a Z-axis worktable 3, an application unit 4, an observation optical system 6, and a CCD camera 7 connected to observation optical system 6, which are arranged inside the process chamber; and a controller 80. Controller 80 includes a monitor 9, a control computer 10, and an operation panel 8.

In the process chamber, Y-axis worktable 2 is placed above the floor of the process chamber. Y-axis worktable 2 is configured to be movable in the Y-axis direction. Specifically, a guide unit is placed on the lower surface of Y-axis worktable 2. The guide unit is slidably connected to a guide rail placed on the floor of the process chamber. A ball screw is connected to the lower surface of Y-axis worktable 2. Y-axis worktable 2 is configured to be movable along the guide rail (in the Y-axis direction) by the ball screw operated by a drive member such as motor. The upper surface of Y-axis worktable 2 forms a mount surface on which a substrate 5, which is a material-to-be-processed, is mounted.

X-axis worktable 1 is placed above Y-axis worktable 2. X-axis worktable 1 is disposed on a structure placed over and extending across Y-axis worktable 2 in the X-axis direction. X-axis worktable 1 is provided with a moving body to which Z-axis worktable 3 is connected, and the moving body is movable in the X-axis direction. The moving body is configured to be movable in the X-axis direction by means of a ball screw for example. X-axis worktable 1 is fixed to the floor of the process chamber with the aforementioned structure in between. Therefore, above-described Y-axis worktable 2 is configured to be movable in the Y-axis direction with respect to X-axis worktable 1.

On the moving body connected to X-axis worktable 1, Z-axis worktable 3 is placed as described above. To Z-axis worktable 3, observation optical system 6 and application unit 4 are connected. Observation optical system 6 is provided for observing an application position of substrate 5 to which a material is applied. CCD camera 7 converts an observed image into an electrical signal. Z-axis worktable 3 holds these observation optical system 6 and application unit 4 so that they are movable in the Z-axis direction.

Control computer 10 and operation panel 8 for controlling these Y-axis worktable 2, X-axis worktable 1, Z-axis worktable 3, observation optical system 6, and application unit 4, as well as monitor 9 associated with control computer 10 are placed outside the process chamber. Monitor 9 displays image data converted by CCD camera 7 and data output from control computer 10. Operation panel 8 is used for entering instructions to control computer 10. Control computer 10 includes a CPU (Central Processing Unit) and a memory. The CPU executes a program stored in the memory to enable various types of control to be performed.

Configuration of Application Unit 4

Figure 2:
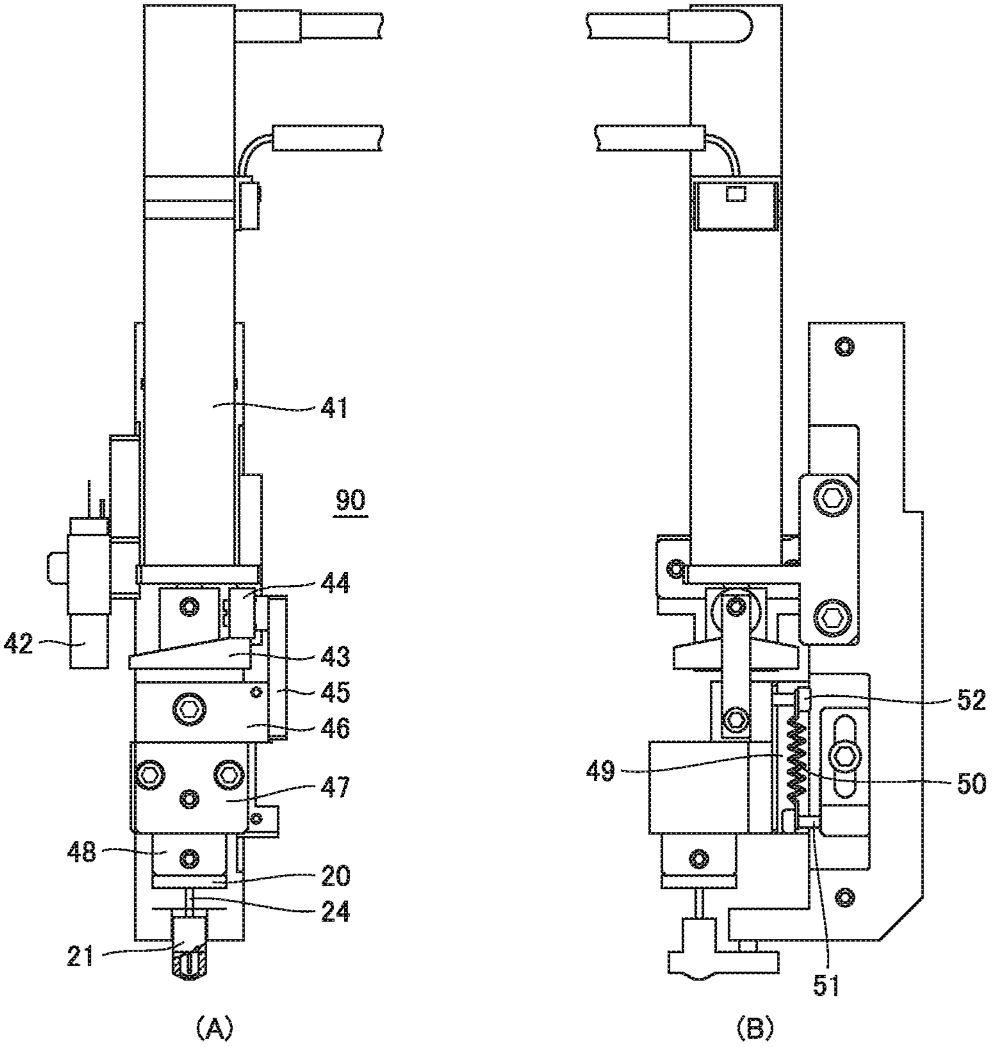
FIG. 2 is a schematic diagram showing an application unit of the application apparatus shown in FIG. 1.
Figure 3:
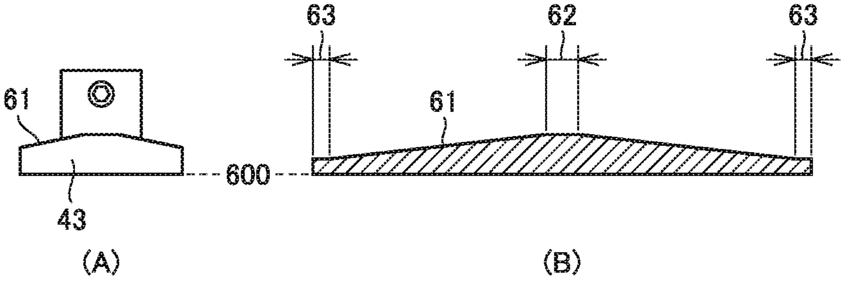
FIG. 3 is a schematic diagram for illustrating a cam member of the application unit shown in FIG. 2.

Application unit 4 is described in more detail with reference to FIGS. 2 and 3. FIG. 2 is a schematic diagram showing application unit 4 of the application apparatus shown in FIG. 1, FIG. 3 is a schematic diagram showing a cam member of application unit 4 shown in FIG. 2. Application unit 4 fixed to Z-axis worktable 3 shown in FIG. 1 includes a servo motor 41, a cam 43, a bearing 44, a cam coupling plate 45, a movable portion 46, an application needle holder 20, an application needle 24 held by application needle holder 20, an application material container 21, and a drive unit 90. Drive unit 90 includes servo motor 41, cam 43, bearing 44, cam coupling plate 45, and movable portion 46.

Servo motor 41 is placed so that its rotational shaft extends in the direction along the Z-axis direction shown in FIG. 1. Cam 43 is connected to the rotational shaft of servo motor 41. Cam 43 is configured to be rotatable about the rotational shaft of servo motor 41.

Cam 43 includes a central portion connected to the rotational shaft of servo motor 41, and a flange portion connected to one end of the central portion. As shown in FIG. 3 (A), the upper surface of the flange portion (the surface facing servo motor 41) is a cam surface 61. Cam surface 61 is formed in an annular shape along the outer periphery of the central portion, and is formed to slope so that the distance from the bottom surface of the flange portion to cam surface 61 varies. Specifically, as shown in FIG. 3 (B), cam surface 61 includes: an upper end flat region 62 where the distance from the bottom surface of the flange portion is the largest distance; a lower end flat region 63 located at a distance from upper end flat region 62, the distance from the bottom surface of the flange portion to lower end flat region 63 being the smallest distance; and a slope portion connecting upper end flat region 62 to lower end flat region 63. FIG. 3 (B) is a development view of the flange portion including cam surface 61 located annularly to surround the central portion, as seen in the lateral direction.

Bearing 44 is disposed to contact cam surface 61 of cam 43. Bearing 44 is disposed in a specific direction (on the right side of servo motor 41) as seen from cam 43 as shown in FIG. 2 (A). While the rotational shaft of servo motor 41 is rotated to rotate cam 43, bearing 44 is kept in contact with cam surface 61. Cam coupling plate 45 is connected to bearing 44. Cam coupling plate 45 has one end connected to bearing 44 and the other opposite end, and the one and the other end are fixed to movable portion 46. An application needle holder fixing portion 47 and an application needle holder housing 48 are connected to movable portion 46, Application needle holder 20 is housed in application needle holder housing 48.

Application needle holder 20 includes application needle 24. Application needle 24 is disposed to protrude front the lower surface of application needle holder 20 (from the lower side opposite to the side where servo motor 41 is located), Under application needle holder 20, application material container 21 is disposed, Application needle 24 is held in the state of being inserted in application material container 21.

Movable portion 46 is provided with a fixing pin 52. A pedestal holding servo motor 41 is provided with another fixing pin 51. A spring 50 is placed to connect fixing pin 51 to fixing pin 52. On movable portion 46, a tensile force toward application material container 21 is exerted by spring 50. The tensile force exerted by spring 50 also acts on bearing 44 via movable portion 46 and cam coupling plate 45. The tensile force exerted by spring 50 causes bearing 44 to be kept pressed against cam surface 61 of cam 43.

Movable portion 46, application needle holder fixing portion 47, and application needle holder housing 48 are connected to a linear guide 49 placed on the pedestal. Linear guide 49 is disposed to extend in the Z-axis direction. Therefore, movable portion 46, application needle holder fixing portion 47, and application needle holder housing 48 are configured to be movable along the Z-axis direction.

Operation of Application Unit

An operation of application unit 4 is now described. In application unit 4, servo motor 41 is driven to rotate the rotational shaft of servo motor 41 and thereby rotate cam 43. As a result, the height, in the Z-axis direction, of cam surface 61 of cam 43 is changed. Therefore, the position, in the Z-axis direction, of bearing 44 which contacts cam surface 61 on the right side of cam 43 in FIG. 2 (A) is also changed with rotation of the drive shaft of servo motor 41. With the change of the position of bearing 44 in the Z-axis direction, movable portion 46, application needle holder fixing portion 47, and application needle holder housing 48 are moved in the Z-axis direction. As a result, application needle holder 20 held by application needle holder housing 48 is also moved in the Z-axis direction. Accordingly, the position, in the Z-axis direction, of application needle 24 placed on application needle holder 20 can be changed.

Figure 4:
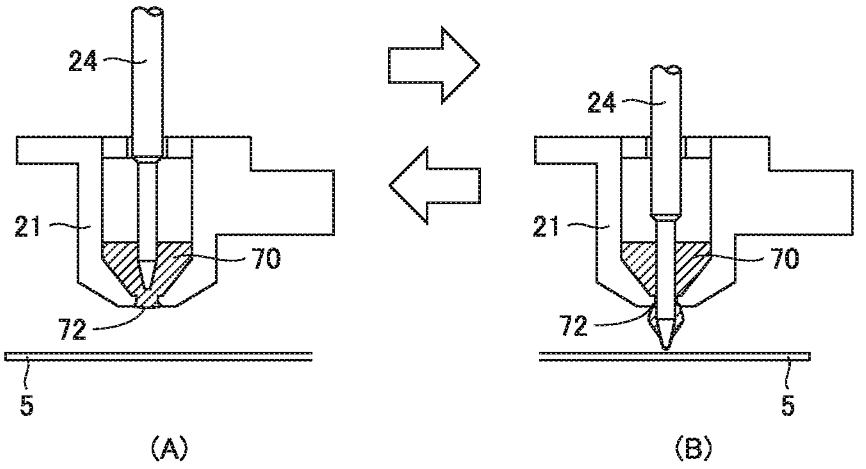
FIG. 4 is a schematic diagram for illustrating an operation of an application needle of the application unit shown in FIG. 2.

Specifically, referring to FIGS. 3 and 4, in the case where hearing 44 contacts upper end flat region 62 of cam surface 61 of cam 43, application needle 24 is located at its upper end position (position closest to servo motor 41) as shown in FIG. 4 (A). At this time, the tip of application needle 24 is in the state of being immersed in an application material 70 held in application material container 21. Application material container 21 has, in its bottom facing a substrate 5 that is a target to be applied with the material, a through hole 72 allowing application needle 24 to protrude from the through hole.

Then, in the case where the rotational shaft of servo motor 41 is rotated to rotate cam 43 and thereby cause bearing 44 to be located at a position where lower end flat region 63 of cam surface 61 contacts bearing 44, application needle 24 is in the state of passing through the through hole 72 formed in the bottom of application material container 21 and protruding downward from the bottom surface of application material container 21 as shown in FIG. 4 (B). At this time, a part of application material 70 adheres to the surface of application needle 24 protruding from the bottom surface of application material container 21. Z-axis worktable 3 (see FIG. 1) moves application unit 4 toward substrate 5 to thereby cause the tip of application needle 24 to contact the surface of substrate 5. Thus, application material 70 can be applied to the surface of substrate 5. It should be noted that Z-axis worktable 3 may be moved first and thereafter servo motor 41 may be driven, or Z-axis worktable 3 and servo motor 41 may be operated substantially simultaneously.

Application unit 4 can convert the rotational motion of servo motor 41 to the motion in the Z-axis direction (up-and-down motion) of application needle 24. Application unit 4 configured in this way can quickly and accurately move application needle 24 in the Z-axis direction.

In order to further increase the precision in the step of applying application material 70 by application needle 24, the operating speed of application needle 24 is controlled in the following way.

Figure 5:
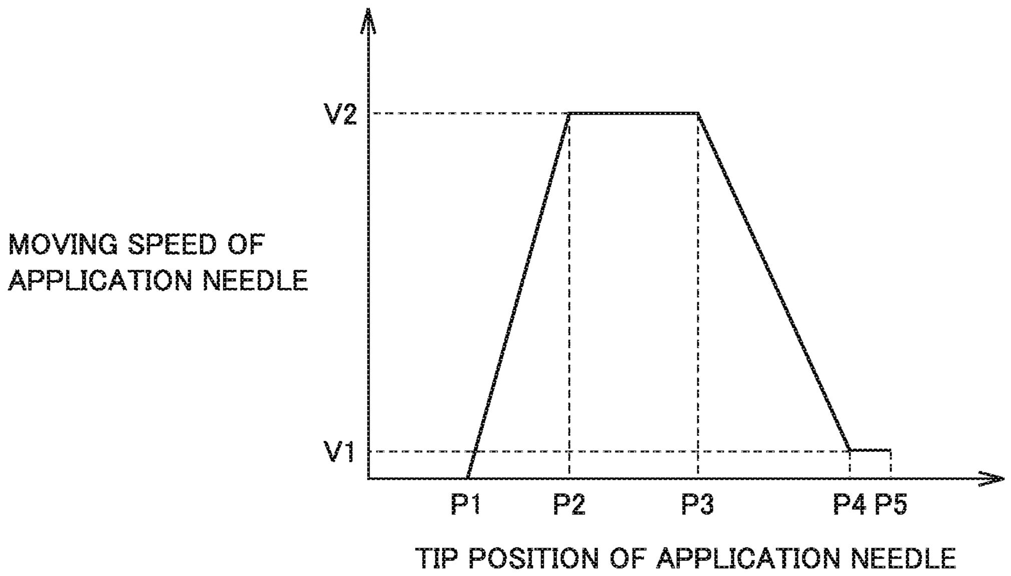
FIG. 5 is a graph for illustrating the operation of the application needle of the application unit shown in FIG. 2.

Specifically, as shown in FIG. 5, the moving speed of application needle 24 is changed depending on the position of application needle 24. In FIG. 5, the horizontal axis represents the position of the tip of application needle 24, and the vertical axis represents the moving speed of the application needle.

As shown in FIG. 4 (A), when application needle 24 is located at the upper end position (position P1 in FIG. 5), servo motor 41 is driven to rotate cam 43 and cause bearing 44 to contact a region other than upper end flat region 62 of cam surface 61. As a result, application needle 24 moves toward substrate 5. Until application needle 24 reaches position P2 on the horizontal axis in FIG. 5, the moving speed of application needle 24 is increased. Specifically, the rotational speed of servo motor 41 can be increased to thereby raise the moving speed of application needle 24.

After reaching a predetermined moving speed V2 (after reaching position P2), application needle 24 is moved while the predetermined speed V2 is maintained. This can be achieved by keeping the rotational speed of servo motor 41 constant. Then, when application needle 24 reaches position P3 in FIG. 5, the moving speed of application needle 24 is lowered. Specifically, the rotational speed of servo motor 41 is gradually lowered. As a result, the moving speed of application needle 24 is sufficiently lowered until predetermined position P4 is reached which is a position before bearing 44 reaches lower end flat region 63 (see FIG. 3).

Then, until application needle 24 at position P4 in FIG. 5 reaches the lower end position (position P5) shown in FIG. 4 (B), application needle 24 is moved at a predetermined low moving speed V1. In this case as well, the rotational speed of servo motor 41 is kept at a predetermined speed. In the case where control is performed in the above-described manner, the moving speed of application needle 24 has been made sufficiently low at the time when application needle 24 contacts substrate 5. Therefore, the impact against substrate 5 when application needle 24 contacts substrate 5 can be reduced, and deterioration of the positional accuracy when application needle 24 applies application material 70 to the surface of substrate 5, due to the aforementioned impact, can be prevented.

Liquids that can be used as an application material are roughly classified into Newtonian fluid and non-Newtonian fluid. A non-Newtonian fluid is classified as any of pseudoplastic fluid, Bingham fluid, and dilatant fluid. Newtonian fluids include water and silicon oil, for example. Pseudoplastic fluids include ketchup, polymeric liquid, and paint, for example. Bingham fluids include toothpaste and butter, for example. Dilatant fluids include water-mixed starch dissolved in water and wet sands at the edge of water on the beach, for example.

Figure 6:
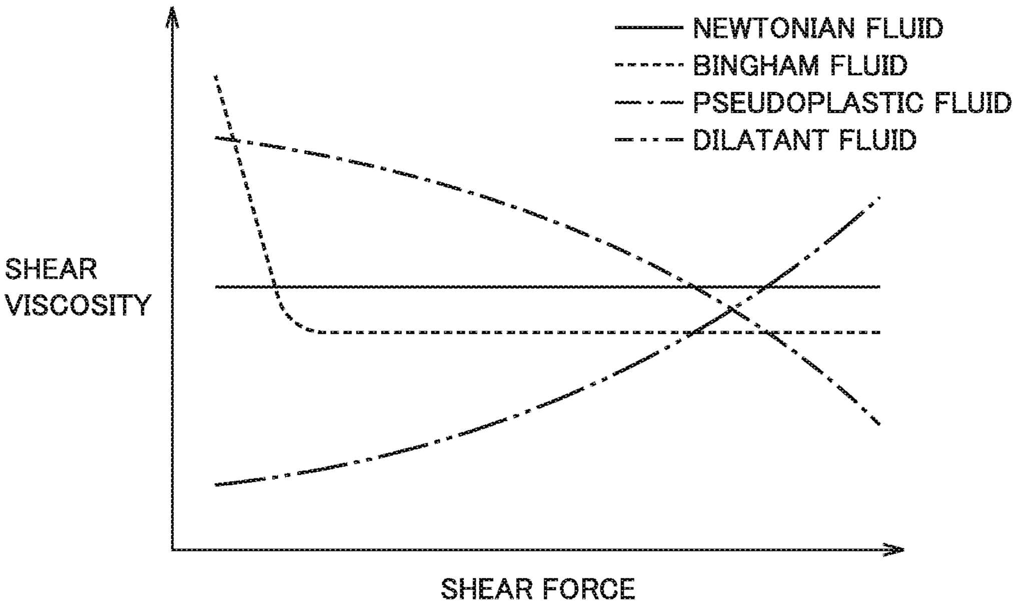
FIG. 6 shows an overview of a relation between the shear force and the shear viscosity, for each type of fluid.

FIG. 6 shows an overview of a relation between the shear force and the shear viscosity, for each type of fluid. The horizontal axis represents the shear force applied to a fluid, and the vertical axis represents the shear viscosity of the fluid. Fluids of the same type differ from each other in terms of the specific magnitude of the shear viscosity. FIG. 6 shows the shear viscosity of a typical fluid, for each type of fluid.

As shown in FIG. 6, the Newtonian fluid has its shear viscosity that is kept unchanged even when the shear force is changed. The pseudoplastic fluid has its shear viscosity that is decreased as the shear force is increased. The Bingham fluid does not exhibit fluidity until the shear force reaches a certain value of viscosity or more. The dilatant fluid has its shear viscosity that is increased as the shear force is increased.

The inventors of the present application used a polymeric aqueous solution as a typical example of the pseudoplastic fluid, to inspect change of the shear viscosity caused by change of the shear speed.

The conditions for measuring were set in the following way. A polymer was dissolved in water to prepare solutions of 0, 0.5, 1, 1.2, 1.5, and 2 (w/v %). The temperature was kept at 25 degrees, and a change of the shear viscosity for a change of the shear speed for each of the prepared solutions was measured. The measuring was repeated three times to determine the average of respective measurements.

Figure 7:
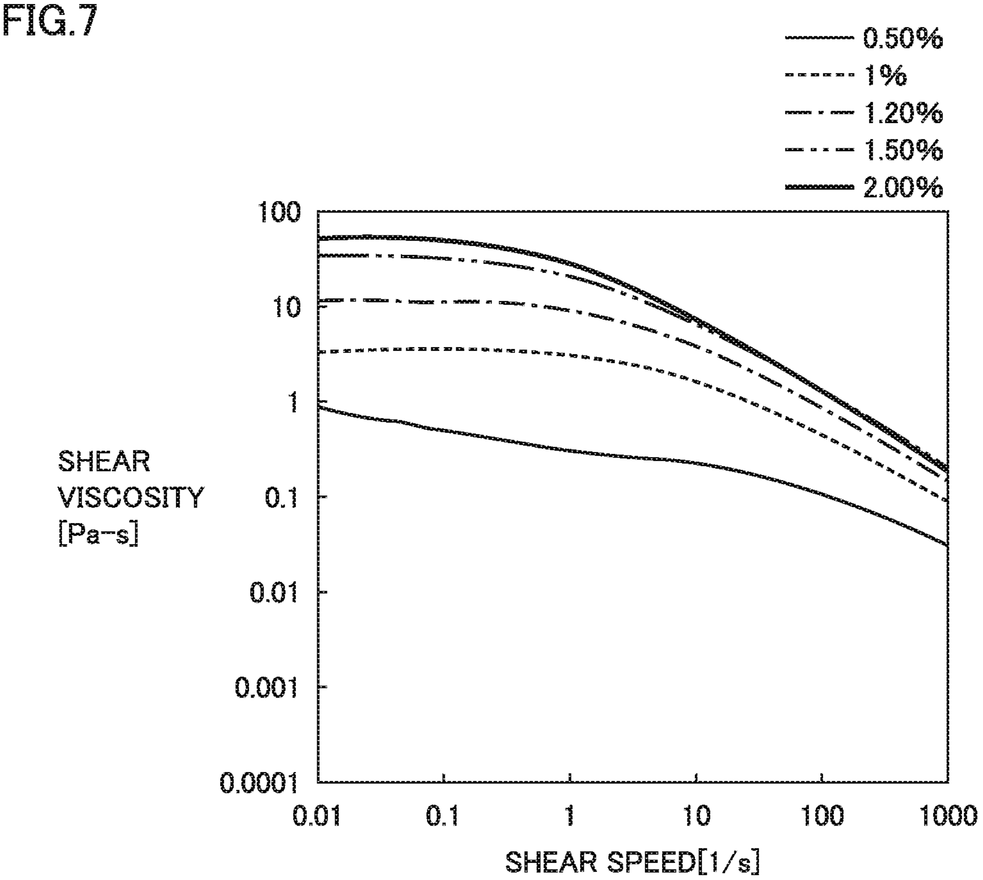
FIG. 7 shows a result of measuring the shear viscosity associated with the shear speed for an application material that is a polymeric aqueous solution.

FIG. 7 shows a result of measuring the shear viscosity for the shear speed for an application material that is a polymeric aqueous solution. As shown in FIG. 7, the shear viscosity of an application material that is a polymeric aqueous solution is smaller as the shear speed is higher. Moreover, the higher the concentration of the polymeric solution, the higher the shear viscosity of the solution.

Further, the inventors of the present application conducted the following application test.

The conditions for measuring were set in the following way. A polymer was dissolved in water to prepare solutions of 0, 0.5, 1, 1.2, and 1.5 (w/v %), The prepared solutions were each poured in an application material container, application needle 24 was moved to protrude from the container at different moving speeds, and the thickness of a droplet adhering to the tip of application needle 24 was measured. This thickness can be used to indirectly express the amount of the adhering liquid. The measuring was repeated three times to determine the average of respective measurements.

Figure 8:
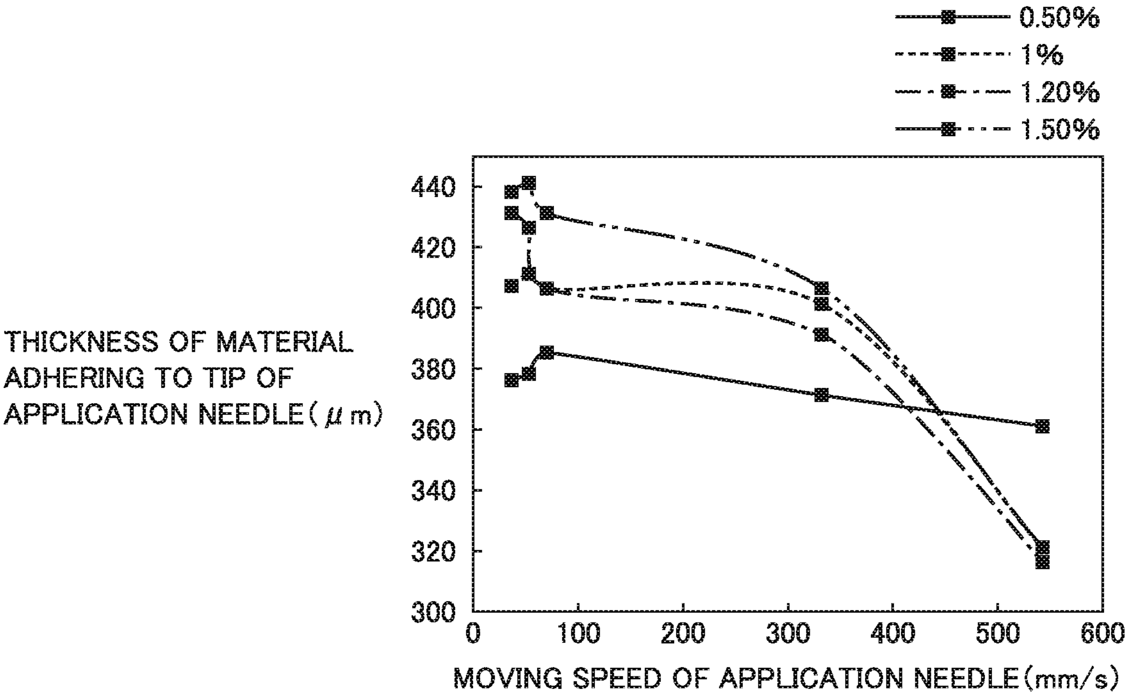
FIG. 8 shows a result of measuring the thickness of a droplet adhering to the tip of an application needle, associated with the moving speed of the application needle for an application material that is a polymeric aqueous solution.

FIG. 8 shows a result of measuring the thickness of a droplet adhering to the tip of application needle 24, associated with the moving speed of application needle 24 for an application material that is a polymeric aqueous solution. The moving speed of application needle 24 corresponds to moving speed V2 in FIG. 5, and this moving speed is the speed of application needle 24 moving downward in the vertical direction when the tip of application needle 24 protrudes from the through hole 72.

As shown in FIG. 8, when the application material is a polymeric aqueous solution, the amount of a droplet adhering to the tip of application needle 24 is decreased as the moving speed of application needle 24 is increased.

The moving speed of application needle 24 is considered as being proportional to the shear speed for the application material. Therefore, for the application material that is a polymeric aqueous solution, it is expected from the results in FIGS. 7 and 8 that the shear viscosity of the application material is decreased as the moving speed of the application material and the shear speed of the application material are increased, and that the decrease of the shear viscosity of the application material causes the speed at which the application material is lifted from the tip of application needle 24 to increase, resulting in decrease of the amount of application.

Figure 9:
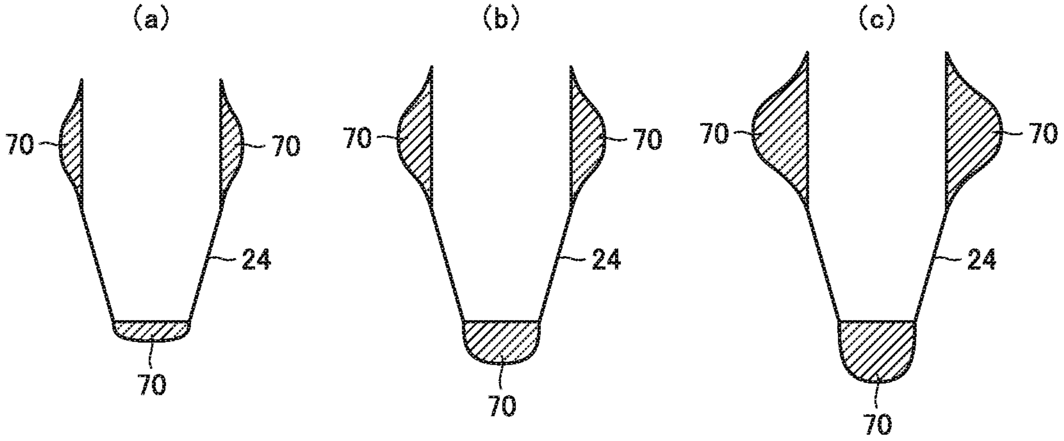
FIG. 9 (*a*) shows an application material that is a polymeric aqueous solution when the application needle is moved at a high speed, FIG. 9 (*b*) shows the application material that is a polymeric aqueous solution when the application needle is moved approximately at a medium speed, and FIG. 9 (*c*) shows the application material that is a polymeric aqueous solution when the application needle is moved at a low speed.

FIG. 9 (*a*) shows application material 70 that is a polymeric aqueous solution when application needle 24 is moved at a high speed. FIG. 9 (*b*) shows application material 70 that is a polymeric aqueous solution when application needle 24 is moved approximately at a medium speed. FIG. 9 (*c*) shows application material 70 that is a polymeric aqueous solution when application needle 24 is moved at a low speed. As shown in these drawings, it is seen that, when the application material is a polymeric aqueous solution, the amount of the applied application material is decreased as the moving speed of application needle 24 is increased.

Accordingly, the inventors of the present application have found that the moving speed of application needle 24 can be changed depending on the type of application material 70 and the target amount of application, to thereby apply the material of the target amount.

In order to accomplish this, control computer 10 controls drive unit 90 to move application needle 24 such that shear is applied to application material 70 at a shear speed depending on the type of the application material and the target amount of application. Specifically, control computer 10 controls drive unit 90 to move application needle 24 such that shear is applied to the application material at a shear speed depending on the type of the application material and the target amount of application when application needle 24 passes through the through hole 72.

More specifically, control computer 10 stores a speed table.

Figures 10, 11:
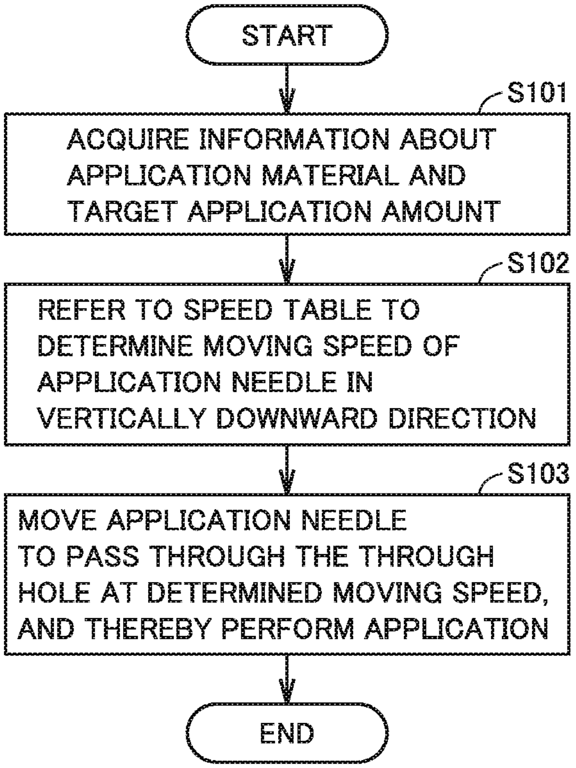
FIG. 10 shows an example speed table according to Embodiment 1.
FIG. 11 is a flowchart showing a procedure of drive control for the application needle according to Embodiment 1.

FIG. 10 shows an example of the speed table according to Embodiment 1. As shown in FIG. 10, the speed table defines a moving speed vk associated with a type ai of the application material and a target application amount bj.

When the type of the application material is the pseudoplastic fluid, the speed table defines the moving speed such that the moving speed is lower as the target application amount is larger. When the type of the application material is the dilatant fluid, the speed table defines the moving speed such that the moving speed is higher as the target application amount is larger. When the type of the application material is the Bingham fluid, the speed table defines the moving speed such that the moving speed is lower as the target application amount is larger if the target application amount is a predetermined value or less, and such that the moving speed is constant regardless of the target application amount if the target application amount is larger than the predetermined value.

Control computer 10 refers to the speed table in FIG. 10 to determine the moving speed of application needle 24 in the vertically downward direction.

FIG. 11 is a flowchart showing a procedure of drive control for application needle 24 according to Embodiment 1.

Referring to FIG. 11, in step S101, control computer 10 acquires information about the application material and the target application amount. This information may be acquired from user input, or acquired automatically by control computer 10 through communication.

In step S102, control computer 10 refers to the speed table drown in FIG. 10 to determine the moving speed of application needle 24 in the vertically downward direction that is associated with the application material and the target application amount.

In step S103, control computer 10 controls movement of application needle 24 such that application needle 24 is passed through the through hole 72 at the determined moving speed, to thereby apply application material 70 to substrate 5.

As seen from the above, the conventional fine application of the non-Newtonian fluid involves a problem that it takes much time to apply the fluid while adjusting the application amount. In contrast, according to the present embodiment, the moving speed of the application needle in the vertically downward direction is controlled depending on the target application amount and the type of the application material, to thereby enable adjustment of the application amount substantially within the time equivalent to that for common application work.

Embodiment 2

Figures 12, 13:
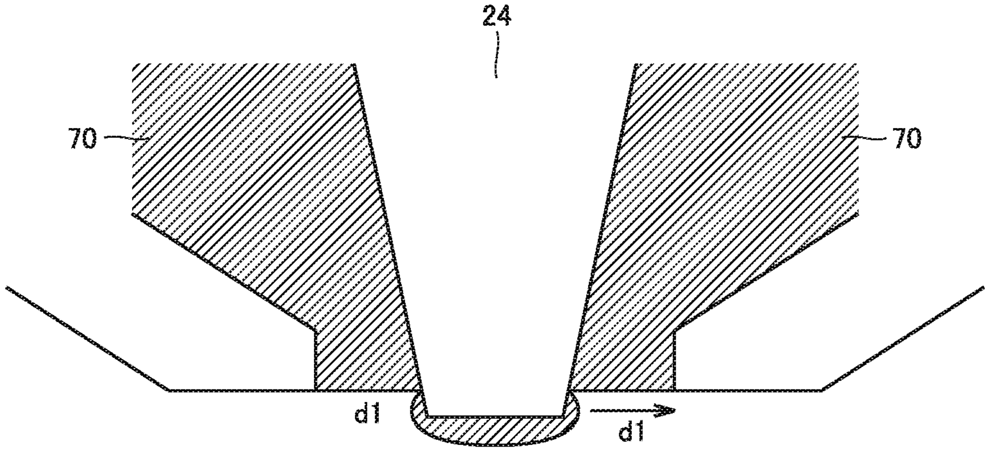
FIG. 12 shows a state of the application needle when protruding through a through hole.

FIG. 12 shows a state of application needle 24 protruding from through hole 72.

When the tip of application needle 24 protrudes from through hole 72, a gap is present between application needle 24 and the outer wall of through hole 72. When the tip is tapered in the forward direction as shown in FIG. 12, for example, the distance d of the gap varies depending on the position on the tip. FIG. 12 shows a distance di at a position on the tip.

The larger the distance between application needle 24 and the outer wall of through hole 72, the smaller the shear force and accordingly the lower the shear viscosity. It is therefore expected that the shear viscosity of the application material decreases as the distance increases, and that the decrease of the shear viscosity of the application material increases the speed at which the application material is lifted upward from the tip of application needle 24, resulting in decrease of the amount of application.

According to the present embodiment, control computer 10 controls drive unit 90 to move application needle 24 such that shear is applied to application material 70 at a shear speed depending on the type of the application material, the target amount of application, and the distance between application needle 24 and the outer wall of through hole 72. As the distance between application needle 24 and the outer wall of through hole 72, the minimum value, the maximum value, or the average value, for example, of distances at respective positions on the tip can be used. Specifically, control computer 10 controls drive unit 90 to move application needle 24 such that shear is applied, when application needle 24 passes through the through hole 72, to the application material at a shear speed depending on the type of the application material, the target amount of application, and the distance between application needle 24 and the outer wall of through hole 72.

FIG. 13 shows an example of the speed table according to Embodiment 2. As shown in FIG. 13, the speed table defines a moving speed vk associated with a type ai of the application material, a target application amount bj, and a distance el between the application needle and the outer wall of the through hole.

The speed table defines the moving speed such that the moving speed is lower as the distance between the application needle and the outer wall of the through hole is larger, for the same type of the application material and the same target application amount.

The speed table defines the moving speed such that the moving speed is lower as the target application amount is larger, for the same distance between the application needle and the outer wall of the through hole and the type of the application material that is the pseudoplastic fluid. The speed table defines the moving speed such that the moving speed is higher as the target application amount is larger, for the same distance between the application needle and the outer wall of the through hole and the type of the application material that is the dilatant fluid. For the same distance between the applicant needle and the outer wall of the through hole and the type of the application material that is the Bingham fluid, the speed table defines the moving speed such that the moving speed is lower as the target application amount is larger when the target application amount is less than or equal to a predetermined value, and such that the moving speed is constant regardless of the target application amount when the target application amount is more than the predetermined value.

Control computer 10 refers to the speed table in FIG. 13 to determine the moving speed of application needle 24 in the vertically downward direction.

Figures 14, 15:
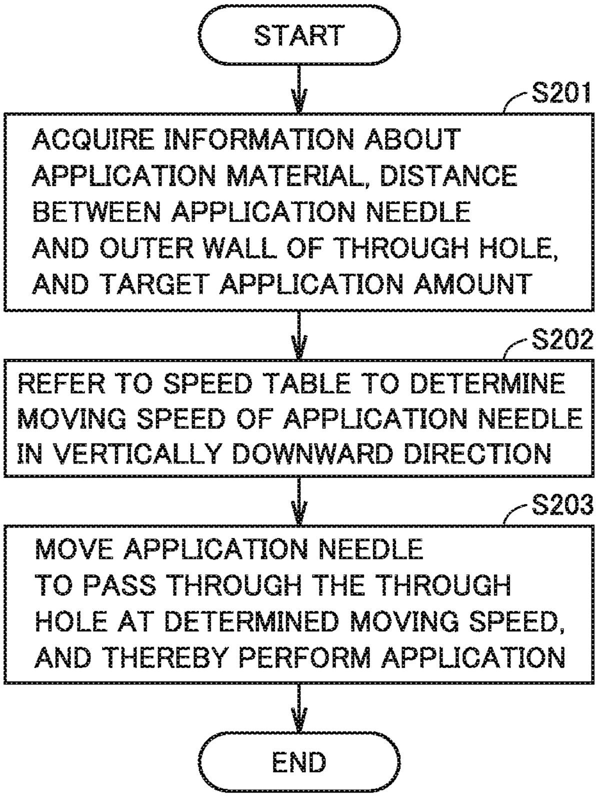
FIG. 14 is a flowchart showing a procedure of drive control for the application needle according to Embodiment 2.
FIG. 15 shows an example speed table according to Modification 1.

FIG. 14 is a flowchart showing a procedure of drive control for application needle 24 according to Embodiment 2.

Referring to FIG. 14, in step S201, control computer 10 acquires information about the application material, the distance between application needle 24 and the outer wall of through hole 72, and the target application amount. This information may be acquired from user input, or acquired automatically by control computer 10 through communication.

In step S202, control computer 10 refers to the speed table shown in FIG. 13 to determine the moving speed of application needle 24 in the vertically downward direction that is associated with the application material and the target application amount.

In step S203, control computer 10 controls movement of application needle 24 such that application needle 24 is passed through the through hole 72 at the determined moving speed, to thereby apply application material 70 to substrate 5.

According to the present embodiment, the moving speed of the application needle in the vertically downward direction is controlled depending on the target application amount, the distance between the application needle and the outer wall of the through hole, and the type of the application material, to thereby enable adjustment of the application amount substantially within the time equivalent to that for common application work.

Modifications of Embodiments 1 and 2

The present disclosure is not limited to the above-described embodiments, but includes the following modifications, for example.

(1) Diameter of Application

The amount of the application is represented by: the diameter of the application representing the size of an applied film; and the thickness of the applied film. When the thickness of the applied film can be regarded as constant, the diameter of the application and the amount of the application are proportional to each other, and therefore, the diameter of the application may be used instead of the amount of the application.

FIG. 15 shows an example of the speed table according to Modification 1. As shown in FIG. 15, the speed table defines a moving speed vk associated with a type ai of the application material and a target application diameter ej.

FIG. 16 shows an example of the speed table according to Modification 2. As shown in FIG. 16, the speed table defines a moving speed vk associated with a type ai of the application material, a target application diameter ej, and a distance cl between the application needle and the outer wall of the through hole.

(2) Storing of Moving Speed

The controller may store the value of the determined moving speed, in order to change the application speed during operation.

Embodiment 3

An application apparatus according to the present embodiment uses, as the application material, a solution containing cells (hereinafter referred to as "cell-containing solution"). The cell-containing solution is also a non-Newtonian fluid, like the Bingham fluid, the pseudoplastic fluid, and the dilatant fluid described in connection with Embodiments 1 and 2.

The inventors of the present application used, as an application material, a cell-containing solution that was a hyaluronic acid solution containing cells, to inspect change of the application amount relative to change of the application speed.

Figure 17:
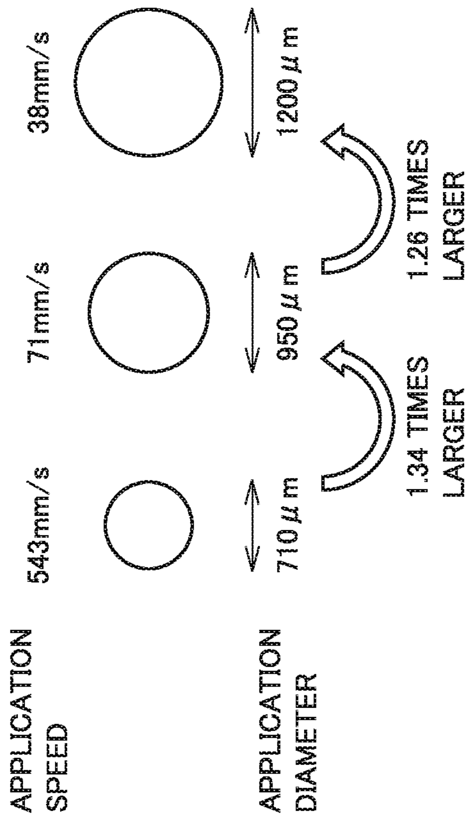
FIG. 17 shows a result of measuring the application diameter associated with the application speed, when the application material is a cell-containing solution that is a hyaluronic acid solution containing cells.

FIG. 17 shows a result of measuring the application diameter associated with the application speed, when the application material is a cell-containing solution that is a hyaluronic acid solution containing cells.

As shown in FIG. 17, when the application material is a cell-containing solution that is a hyaluronic acid solution containing cells, the application diameter, i.e., the application amount, is smaller as the application speed is higher. Thus, the application apparatus according to the present embodiment can be used to change the number of applied cells by changing the application speed, under the condition that the concentration of cells in the cell-containing solution is constant.

The speed table in FIG. 10 described above in connection with Embodiment 1 can include a cell-containing solution as an application material. The speed table in FIG. 10 can define the moving speed such that the moving speed is lower as the target application amount is larger, when the type of the application material is the cell-containing solution.

The speed table in FIG. 13 described above in connection with Embodiment 2 can include a cell-containing solution as an application material. The speed table in FIG. 13 can define the moving speed such that the moving speed is lower as the target application amount is larger for the same distance between the application needle and the outer wall of the through hole, when the type of the application material is a cell-containing solution.

Embodiment 4

Figure 18:
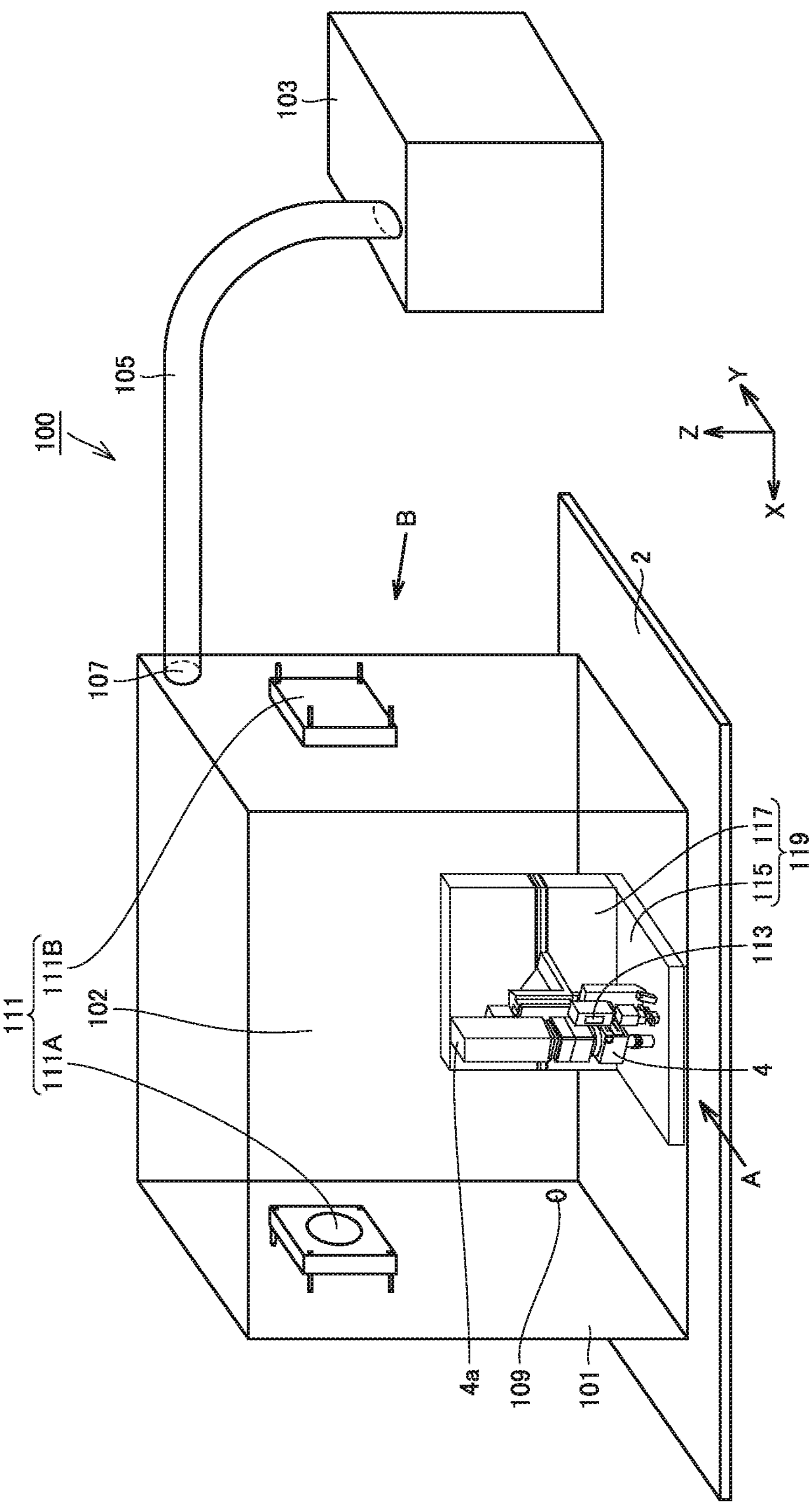
FIG. 18 is a schematic diagram showing a configuration of a region located around the application unit and including a humidity controller according to the present embodiment.

A general description is given first, which is repeated later herein, of characteristics of the present embodiment. Referring to FIG. 18, an application apparatus 100 according to the present disclosure includes application unit 4, a cover 101, a humidity controller 103, and a gas passage 105. Application unit 4 supplies a liquid material (application material) to substrate 5, which is a target material-to-be-processed mounted on Y-axis worktable 2. As seen in the Z direction which is a first direction, cover 101 spreads over application unit 4. Humidity controller 103 is capable of controlling the humidity in a space 102 formed by cover 101 and Y-axis worktable 2. Gas passage 105 allows a gas such as air having a controlled humidity to be supplied from humidity controller 103 into space 102 through a flow inlet 107 formed in cover 101. Cover 101 includes a wall. The wall surrounds application unit 4 in the Y direction which is a second direction orthogonal to the Z direction which is the first direction, and in the X direction winch is a third direction orthogonal to the Z direction and the Y direction. Application apparatus 100 is capable of adjusting the humidity in space 102 to 80% or more.

Operation of Application Apparatus

An operation of the application apparatus shown in FIG. 1 is now described.

In the case where a circuit pattern is to be drawn by the application apparatus shown in FIG. 1, substrate 5 to which a material is to be applied is prepared first (step (S10)). After substrate 5 is mounted on Y-axis worktable 2 of the application apparatus, a region of substrate 5 where the circuit pattern is to be drawn is moved to the position directly below observation optical system 6 by operating X-axis worktable 1 and Y-axis worktable 2. The drawing start position where drawing is to be started is observed and confirmed by observation optical system 6 to determine the drawing start position. The determined drawing start position is used as a reference, and Z-axis worktable 3 is operated with respect to this reference to thereby lower application unit 4 to a position above substrate 5, namely the position where the tip of application needle 24 contacts substrate 5 when application needle 24 protrudes. In this state, servo motor 41 is operated to cause application needle 24 to protrude, and accordingly cause application needle 24 with its surface to which a liquid material (application material) adheres, to contact the surface of substrate 5. Specifically, X-axis worktable 1 and Y-axis worktable 2 are used to move substrate 5 from the drawing start position, so that the position where the circuit pattern is to be drawn is located directly below application unit 4. At the time when this movement is completed, Z-axis worktable 3 is used to lower application unit 4 (move application unit 4 toward substrate 5), and servo motor 41 of application unit 4 is driven to cause application needle 24 to protrude. Accordingly, the liquid material (application material) is applied to substrate 5 by application needle 24. After this, Z-axis worktable 3 is used to raise application unit 4. In the case where the liquid material is continuously applied, application unit 4 is lowered by Z-axis worktable 3 and thereafter X-axis worktable 1 and Y-axis worktable 2 are used to move the drawing position of substrate 5 so that the drawing position is successively located directly below application unit 4, After this movement is completed, servo motor 41 of application unit 4 is driven to cause application needle 24 to protrude and thereby apply the liquid material. Such an operation is successively repeated to draw the circuit pattern on the surface of substrate 5 (step (S20)). At this time, it is preferable to perform control so that the moving speed of application needle 24 is lowered in advance before causing application needle 24 to contact substrate 5.

Configuration of Region Around Application Unit

Figure 19:
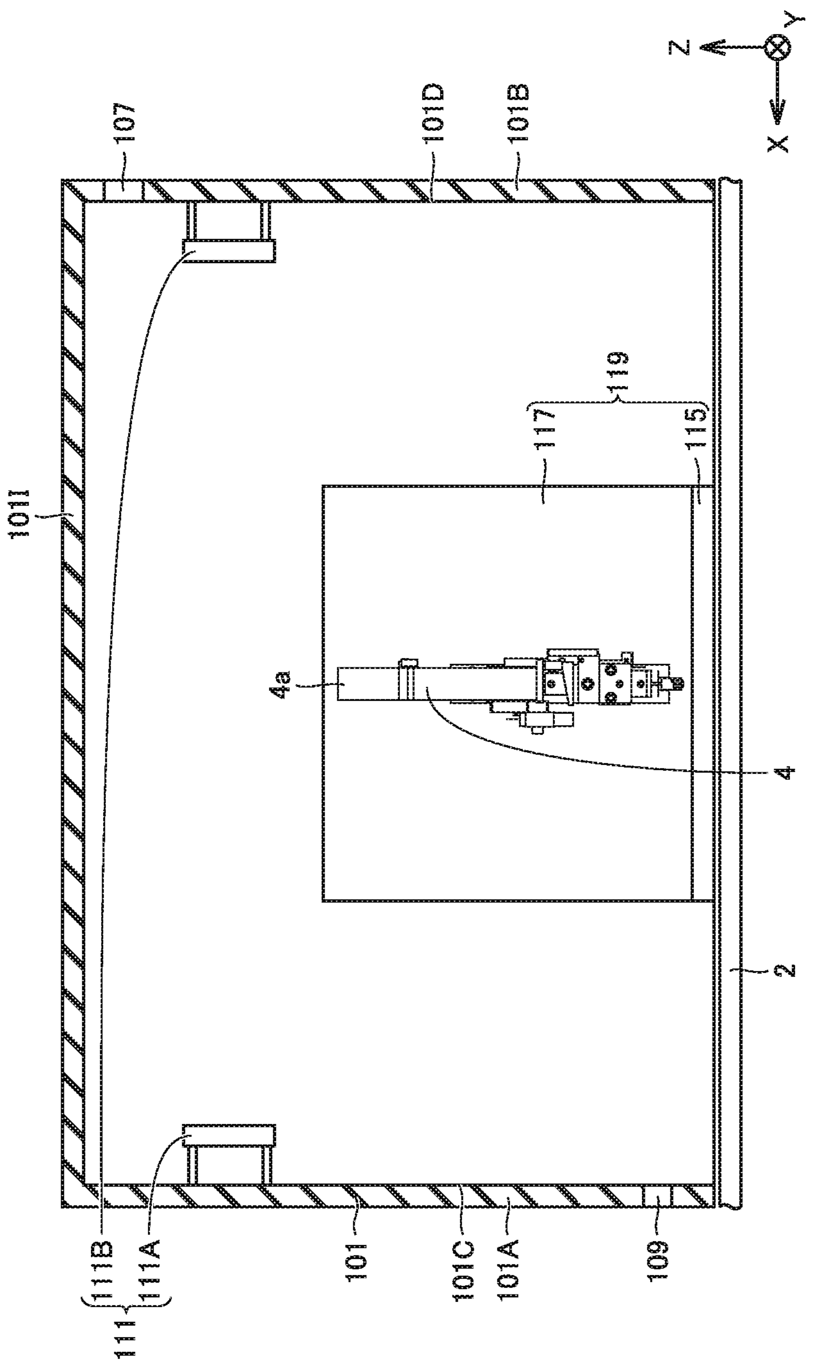
FIG. 19 is a schematic diagram showing a configuration of a cover and the inside of the cover as seen in direction A indicated by the arrow in FIG. 18, according to a first example of the present embodiment.
Figure 20:
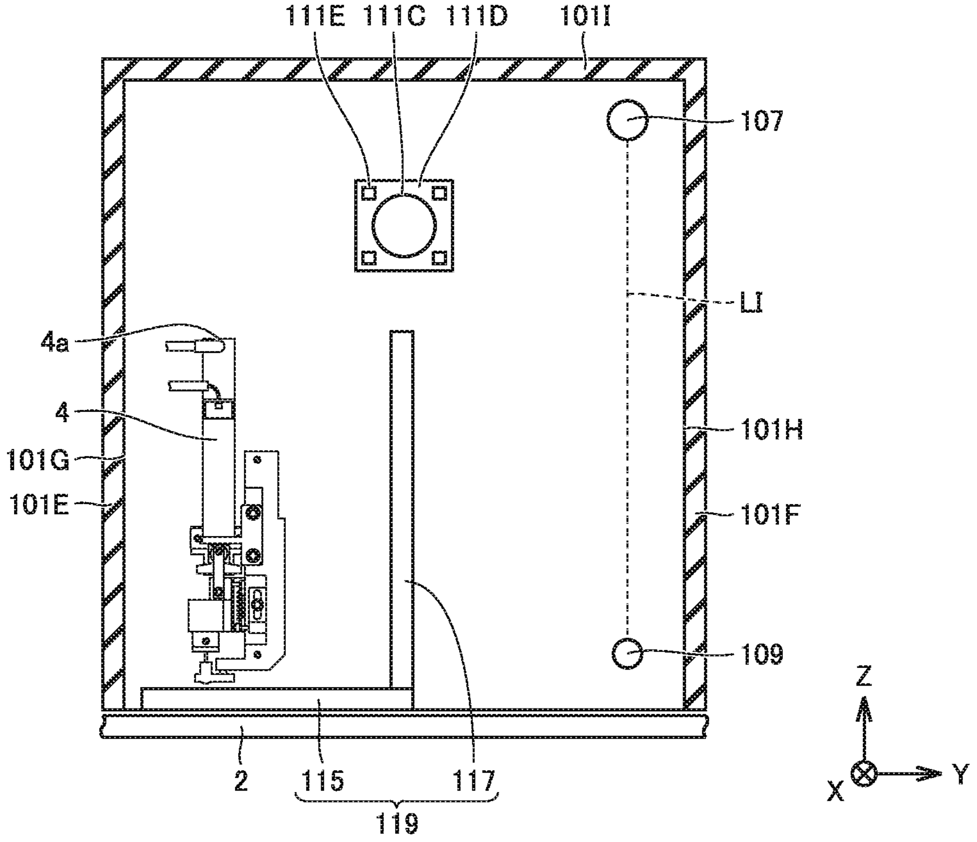
FIG. 20 is a schematic diagram showing a configuration of the cover and the inside of the cover as seen in direction B indicated by the arrow in FIG. 18, according to the first example of the present embodiment.
Figure 21:
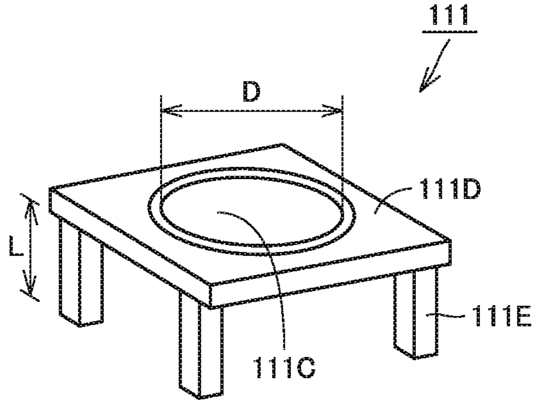
FIG. 21 is a schematic diagram showing a configuration of a fan in FIGS. 18 to 20.

A configuration of a region around application unit 4 in application apparatus 100 is now described with reference to FIGS. 18 to 24. FIG. 18 is a schematic diagram showing a configuration of a region located around the application unit and including the humidity controller according to the present embodiment. FIG. 19 is a schematic diagram showing a configuration of the cover and the inside of the cover in a first example of the present embodiment, as seen in direction A indicated by the arrow in FIG. 18. FIG. 20 is a schematic diagram showing the configuration of the cover and the inside of the cover in the first example of the present embodiment, as seen in direction B indicated by the arrow in FIG. 18. FIG. 21 is a schematic diagram showing a configuration of a fan in FIGS. 18 to 20. First with reference to FIGS. 18 to 21, the first example of the present embodiment is described.

Referring to FIG. 18, application apparatus 100 includes each of the below-described members in the region around application unit 4. Application apparatus 100 chiefly includes cover 101, humidity controller 103, and gas passage 105.

Cover 101 spreads over application unit 4 as seen in the Z direction which is the first direction. Cover 101 of application apparatus 100 in FIG. 18 covers application unit 4 from above in the Z direction in FIG. 18. Cover 101 includes the wall spreading over application unit 4. The wall of cover 101 surrounds application unit 4 in the Y direction which is the second direction orthogonal to the Z direction and in the X direction which is the third direction orthogonal to the Z direction and the Y direction. Specifically, the wall of cover 101 placed over application unit 4 is arranged to sandwich application unit 4 in the X direction and also in the Y direction as seen in plan view. While cover 101 is not necessarily limited to a transparent member, FIG. 18 shows, by a solid line, each of the members arranged inside cover 101, for the convenience of description.

Cover 101 is placed on and extends over the upper surface of Y-axis worktable 2, for example. At this time, space 102 is formed inside cover 101 to be surrounded by the wall of cover 101 and Y-axis worktable 2.

Humidity controller 103 is a device capable of controlling the humidity in space 102. Specifically, in order to increase the humidity in space 102, for example, humidity controller 103 supplies a high-humidity gas into space 102. Accordingly, the humidity in space 102 in application apparatus 100 can be adjusted to 80% or more.

In order to adjust the humidity in space 102 to 80% or more, humidity controller 103 can supply humidified air having a humidity of 90% or more. Humidified air of 90% or more can be used to increase the humidity in space 102 to 80% or more in a short time and keep the increased humidity. Humidity controller 103 may use, as a method for adjusting the humidity of a gas to be supplied, such as air, to 90% or more, a method to generate water droplets having a particle size of 5 μm or less by ultrasonic waves, for example, and blow gas containing the droplets toward the outside, for example. Preferably, humidity controller 103 includes an ultrasonic oscillation generator, a micro-water-droplets generator using ultrasonic oscillations, and a fan for blowing gas containing the micro water droplets into cover 101.

Gas passage 105 allows gas with its humidity controlled by humidity controller 103 to be supplied from humidity controller 103 into space 102 through flow inlet 107 formed in cover 101. A humidity sensor 113 is provided in space 102. Humidity sensor 113 is placed at an upper portion, in the Z direction, of application unit 4 in cover 101, for example. Humidity sensor 113 measures the humidity in space 102 and sends a result of the measuring to humidity controller 103. Based on a difference between the result of the measuring and a humidity set at humidity controller 103, humidity controller 103 adjusts the humidity and the flow rate of gas such as air to be supplied toward space 102. In this way, the humidity in space 102 located around application unit 4 and surrounded by cover 101 can be kept at a set humidity.

Humidity sensor 113 may be placed at a location other than the above-described one. For example, the location(s) and the number of humidity sensor(s) 113 may be changed to any locations) and any number. In this way, the response of humidity controller 103 to the measurement of the humidity of humidity sensor 113 as well as the uniformity of the humidity in space 102 can be improved.

FIGS. 19 and 20 also show the inside members that can be seen from the outside, regardless of the material for cover 101, for the sake of convenience of description. Referring to FIGS. 18, 19, and 20, flow inlet 107 in the wall of cover 101 is located on the opposite side to Y-axis worktable 2 in the Z direction with respect to application unit 4, namely located upward of application unit 4. Flow inlet 107 may have a shape of a circle as shown in FIG. 20, or a polygon such as rectangle, for example.

In addition, an exhaust outlet 109 is formed in the wall of cover 101. Exhaust outlet 109 allows gas in space 102 to be released into the outside of space 102. As shown in FIG. 20, in the Y direction, application unit 4 is located away from a line LI connecting flow inlet 107 to exhaust outlet 109. Specifically, in FIG. 20, both flow inlet 107 and exhaust outlet 109 are located in the right region with respect to the center of cover 101 in the Y direction. In contrast, application unit 4 is located in the left region with respect to the center of cover 101 in the Y direction. Therefore, line LI indicated by the dotted line in FIG. 20 does not extend through application unit 4.

As shown in FIGS. 18 to 20, cover 101 is made up of the wall having a box shape that is rectangular as seen in plan view, for example. Specifically, the box-shaped wall of cover 101 has a top wall 1011 in the Z direction, a pair of walls 101A, 101B facing each other, and a pair of walls 101E, 101F facing each other, i.e., has five walls in total. The pair of walls 101A, 101B orthogonally intersect top wall 1011, for example. The pair of walls 101A, 101B are located at respective ends of cover 101 in the X direction. Wall 101A is located at the positive end of cover 101 in the X direction in FIGS. 18 to 20, while wall 101B is located at the negative end of cover 101 in the X direction. The pair of walls 101E, 101F orthogonally intersect top wall 1011, for example. The pair of walls 101E, 101F are located at respective ends of cover 101 in the Y direction. Wall 101E is located at the negative end of cover 101 in the Y direction in FIGS. 18 to 20, while wall 101F is located at the positive end of cover 101 in the Y direction.

Cover 101 in FIGS. 18 to 20 has a shape of a rectangular parallelepiped as described above, and only the bottom part of cover 101 in the Z direction is an opening instead of a wall. Such a cover 101 can be placed with its lowermost part in the Z direction facing or contacting Y-axis worktable 2, so as to cover application unit 4. Cover 101, however, is not limited to such a rectangular parallelepiped. For example, cover 101 may not have five independent walls as described above. As long as cover 101 meets the condition that the cover surrounds application unit 4 in the X direction and the Y direction, cover 101 may for example have a dome shape with a curved wall crossing the X direction and a curved wall crossing the Y direction that are connected together at the top. In addition, any portion of cover 101 may be a curved surface. Moreover, cover 101 may extend over Y-axis worktable 2, and Y-axis worktable 2 may be placed in space 102.

Flow inlet 107 is formed in one of the pair of walls 101A, 101B, which is for example wall 101B. Exhaust outlet 109 is formed in the other of the pair of walls 101A, 101B, which is for example wall 101A. On the contrary, flow inlet 107 may be formed in wall 101A and exhaust outlet 109 may be formed in wall 101B. Each of flow inlet 107 and exhaust outlet 109 is formed in either of walls 101A, 101B both crossing the X direction (extending along the YZ plane), for example.

Flow inlet 107 is formed in one wall of a pair of walls that face each other, and exhaust outlet 109 is formed in the other wall, which is different from the wall in which flow inlet 107 is formed, of the pair of walls that face each other. The pair of walls that face each other is not limited to the pair of walls of box-shaped cover 101 like the one shown in FIGS. 18 to 20, but includes a pair of parts facing each other that constitute a single curved surface forming a dome, for example.

Cover 101 in FIGS. 18 to 20 has its dimension in the X direction larger than its dimension in the Y direction. Specifically, the distance from wall 101A to wall 101B is larger than the distance from wall 101E to wall 101F. Preferably, flow inlet 107 and exhaust outlet 109 are thus formed in a pair of respective walls (or a pair of parts of a wall that face each other) larger in distance therebetween than the other pair of walls.

As shown in FIG. 20, flow inlet 107 and exhaust outlet 109 are formed to occupy the same position in the Y direction. Specifically, flow inlet 107 and exhaust outlet 109 are formed such that respective positions in the direction (V coordinates) at least partially overlap each other as seen in plan view in the X direction. When flow inlet 107 is identical to exhaust outlet 109 in terms of the size and the shape as seen in plan view, flow inlet 107 and exhaust outlet 109 may be formed such that respective positions in the Y direction substantially completely overlap each other.

As shown in FIGS. 18 to 20, flow inlet 107 and exhaust outlet 109 are formed opposite to each other with respect to the opposite side to Y-axis worktable 2, namely with respect to the upper end of application unit 4 (upper end 4*a* of application unit 4). Specifically, for example, flow inlet 107 is formed upward of upper end 4*a* of application unit 4, while exhaust outlet 109 is formed downward of upper end 4*a* of application unit 4.

Respective walls 101A, 101B of cover 101 that face each other in the X direction are equipped with a pair of fans 111. An inner wall surface 101C of wall 101A is equipped with a fan 111A and an inner wall surface 101D of wall 101B is equipped with a fan 111B. Preferably, fan 111A and fan 111B are thus formed on a pair of respective walls (or a pair of parts of a wall that face each other) larger in distance therebetween than the other pair of walls. Therefore, in FIGS. 18 to 20, fan 111A and fan 111B are attached respectively to wall 101A and wall 101B separated further away from each other than wall 101E and wall 101F. A pair of fans 111A, 111B are placed toward Y-axis worktable 2 relative to flow inlet 107 in the Z direction, i.e., placed downward of flow inlet 107 in the Z direction. Preferably, a pair of fans 111A, 111B are placed opposite to Y-axis worktable 2 with respect to exhaust outlet 109 in the Z direction, i.e., placed upward of exhaust outlet 109.

Fan 111, i.e., a pair of fans 111A, 111B each have the following configuration. Referring to FIG. 21, fan 111 includes a rotary vane 111C, a surrounding portion 111D, and four legs 111E. Rotary vane 111C is a portion having a blade actually rotated by driving fan 111. It is therefore preferable that the outer rim of rotary vane 111C is at least partially arc-shaped, Surrounding portion 111D surrounds rotary vane 1110 from the outside as seen in plan view. While the outer rim of surrounding portion 111D has a square shape, for example, the shape is not limited to this. In surrounding portion 111D, a hollow portion is formed so that rotary vane 111C can be received centrally in the hollow portion. With legs 111E, surrounding portion 111D is attached to inner wall surface 101C, 101D for example of cover 101. While the number of legs 111E is preferably four, the number is not limited to this but may be any number. Four legs 111E extend (downward in FIG. 21) from the main surface of the rectangle of surrounding portion 111D, in the direction orthogonally crossing the main surface, for example.

It is supposed that leg 111E extends over a length L and the arc shape of the outer rim of rotary vane 111C has a diameter D. Length L of leg 111E corresponds to the distance from inner wall surface 101C to which the leg is attached, to rotary vane 111C or surrounding portion 111D. L is preferably a length of 40% or more, more preferably 50% or more of D. In this way, advantageous effects described later herein can be derived sufficiently from fan 111. In addition, condensation of a region between surrounding portion 111D of fan 111 and wall 101A, 101B, 101E, 101F to which fan 111 is attached, due to humidified air staying in this region, can be suppressed.

Referring again to FIGS. 18 to 20, preferably application apparatus 100 further includes a partition 117 located between application unit 4 and flow inlet 107. Partition 117 is a flat plate member having a rectangular shape, for example. Partition 117 is preferably placed between application unit 4 and flow inlet 107 in the Y direction, so that the main surface (having a relatively larger surface area) of the flat plate member faces application unit 4 and flow inlet 107 in the Y direction.

Partition 117 may be a part of a partition member 119 including a support 115 as a part of partition member 119. Specifically, a flat plate member forming support 115 may be bent at about 90° relative to support 115 to form partition 117. In this case, support 115 and partition 117 are integrated into partition member 119. In partition member 119, support 115 and partition 117 may be separate flat plate members, for example, that are joined together to form partition member 119. Support 115 is a portion forming a base for mounting partition member 119 on Y-axis worktable 2, for example.

Partition 117 (partition member 119 including partition 117) may be a separate member from cover 101, and support 115 may be mounted on Y-axis worktable 2, for example. Substrate 5 which is a target material-to-be-processed may be mounted directly on Y-axis worktable 2, This is in the case where support 115 is small to the extent that support 115 fails to extend over a region where substrate 5 is mounted. Substrate 5, however, may be mounted on support 115. This is in the case where support 115 is large to the extent that support 115 overlaps the region where substrate 5 is mounted. Such an example is shown in FIGS. 18 to 20. Alternatively, partition 117 (partition member 119 including partition 117) may be integrated with cover 101.

Figure 22:
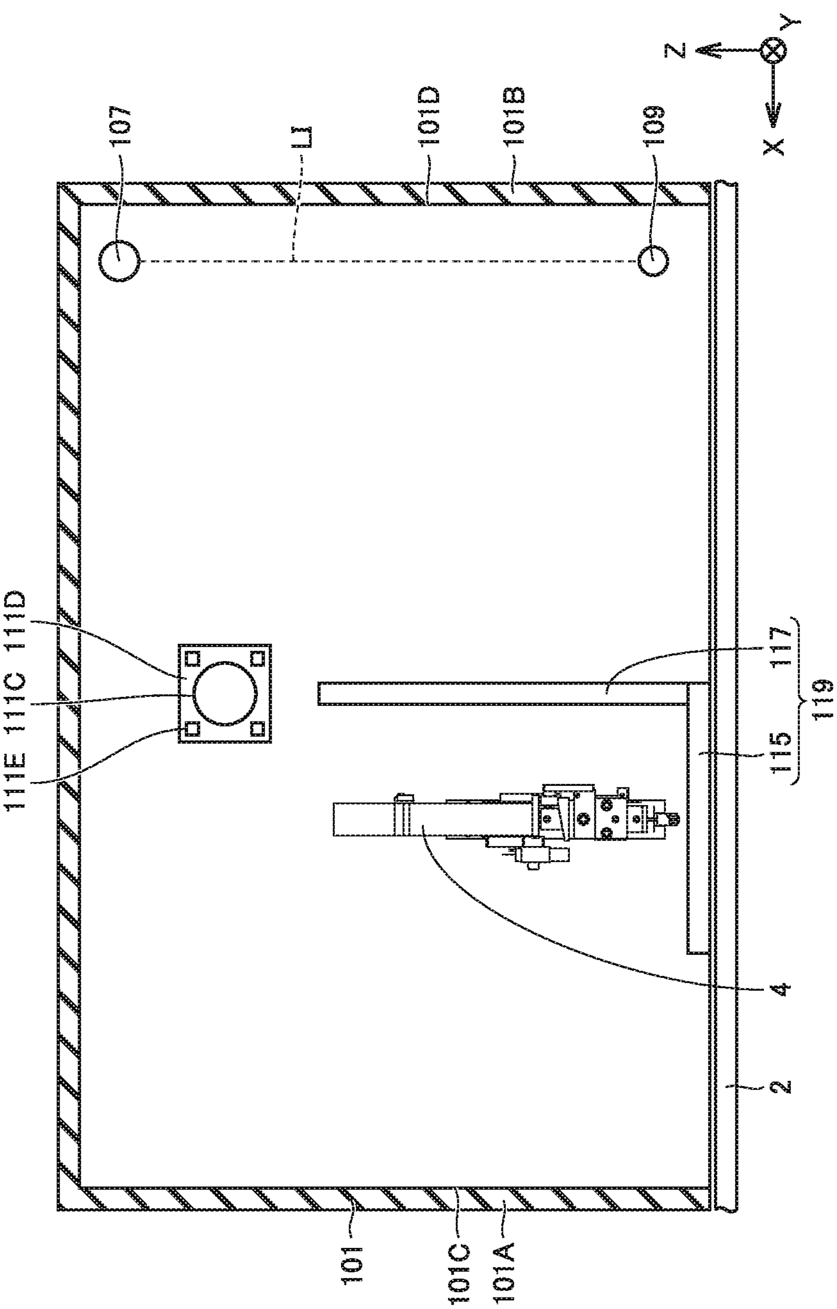
FIG. 22 is a schematic diagram showing the cover and the inside of the cover as seen in direction A indicated by the arrow in FIG. 18, according to a second example of the present embodiment.
Figure 23:
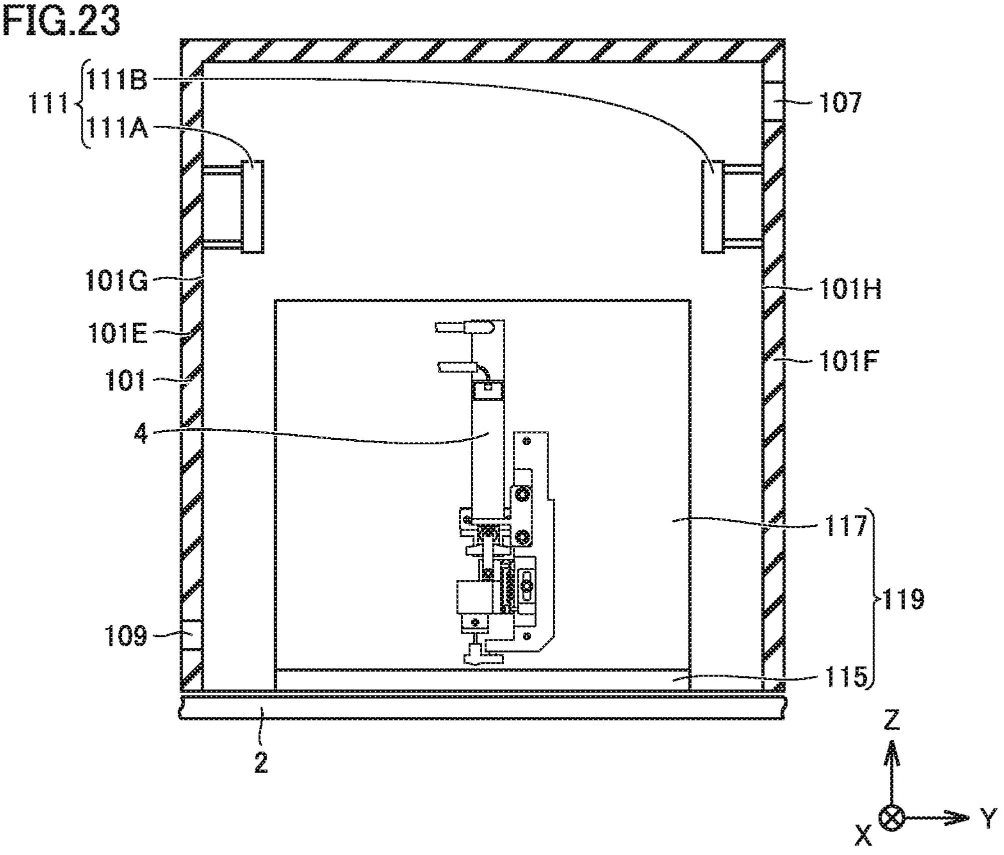
FIG. 23 is a schematic diagram showing the cover and the inside of the cover as seen in direction B indicated by the arrow in FIG. 18, according to the second example of the present embodiment.

FIG. 22 is a schematic diagram showing a configuration of the cover and the inside of the cover in a second example of the present embodiment, as seen in direction A indicated by the arrow in FIG. 18. FIG. 23 is a schematic diagram showing the configuration of the cover and the inside of the cover in the second example of the present embodiment, as seen in direction B indicated by the arrow in FIG. 18. Referring to FIGS. 22 and 23, the second example of the present embodiment is basically similar to the first example of the present embodiment in FIGS. 18 to 20, in terms of the configuration of cover 101 and the like in the region around application unit 4. The same components are therefore denoted by the same reference characters, and the description thereof is not herein repeated as long as they have the same structure and functions for example. Moreover, those components of application apparatus 100 in the second example of the present embodiment that are not shown in FIGS. 22 and 23 are all similar to those of application apparatus 100 in the first example of the present embodiment, and therefore, the description is not repeated herein. This is applied as well to the description of examples subsequent to those of the present embodiment.

As shown in the second example in FIGS. 22 and 23, flow inlet 107 and exhaust outlet 109 may be formed in a pair of respective walls (or a pair of parts of a wall that face each other) smaller in distance between these walls than the other pair of walls. Specifically, flow inlet 107 and exhaust outlet 109 may be formed, for example, in walls 101E, 101F both crossing the Y direction (extending along the ZX plane). Flow inlet 107 may be formed in wall 101F and exhaust outlet 109 may be formed in wall 101E as shown in FIG. 23, or vice versa. In the second example as shown in FIG. 22, application unit 4 is located away from line LI connecting flow inlet 107 to exhaust outlet 109, in the X direction. Moreover, in the second example as shown in FIG. 22, flow inlet 107 and exhaust outlet 109 are formed to occupy the same position in the X direction.

Moreover, as shown in the second example in FIGS. 22 and 23, fan 111A and fan 111B may be attached respectively to wall 101E and wall 101F smaller in distance therebetween than the distance between wall 101A and wall 101B. Thus, a pair of fans 111A, 111B may be mounted for example on respective inner wall surfaces 101G, 101H of walls 101E, 101F of cover 101 that face each other in the Y direction.

Figure 24:
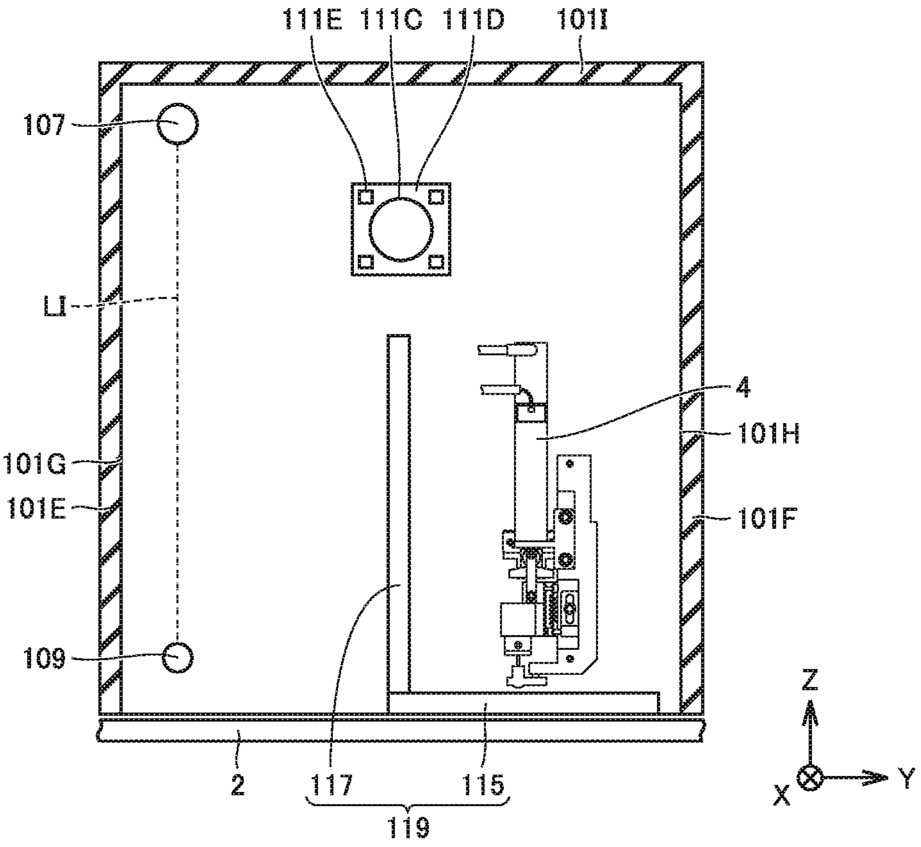
FIG. 24 is a schematic diagram showing the cover and the inside of the cover as seen in direction B indicated by the arrow in FIG. 18, according to a third example of the present embodiment.

FIG. 24 is a schematic diagram showing a configuration of the cover and the inside of the cover in a third example of the present embodiment, as seen in direction B indicated by the arrow in FIG. 18. Referring to FIG. 24, as shown in the third example of the present embodiment, flow inlet 107 and exhaust outlet 109 are both placed in a region located leftward of the center of cover 101 in the Y direction. In contrast, application unit 4 is placed in a region located rightward of the center of cover 101 in the Y direction. Therefore, line LI indicated by the dotted line in FIG. 24 does not extend through application unit 4. Thus, FIG. 24 is a laterally inverted version of FIG. 20 with respect to the Y direction. This configuration may also be used. Moreover, the location of flow inlet 107 and exhaust outlet 109 and the location of application unit 4 may be laterally inverted (which is not shown) with respect to the X direction, relative to the second example in FIG. 22.

Functions and Advantageous Effects

Functions and advantageous effects of the present embodiment are now described.

Application apparatus 100 according to the present disclosure includes application unit 4, cover 101, humidity controller 103, and gas passage 105. Application unit 4 supplies a liquid material (application material) to substrate 5, which is a target material-to-be-processed mounted on Y-axis worktable 2. As seen in the Z direction which is the first direction, cover 101 spreads over application unit 4. Humidity controller 103 is capable of controlling the humidity in space 102 formed by cover 101 and Y-axis worktable 2. Gas passage 105 allows a gas such as air having a controlled humidity to be supplied from humidity controller 103 into space 102 through flow inlet 107 formed in cover 101. Cover 101 includes a wall. The wall surrounds application unit 4 in the Y direction which is the second direction orthogonal to the Z direction which is the first direction, and in the X direction which is the third direction orthogonal to the Z direction and the Y direction. The humidity in space 102 can be adjusted to 80% or more.

In this way, it is possible to suppress quick evaporation of moisture in an applied pattern, which may occur when a miniature pattern is applied with a single application needle 24 in space 102 in which the adjustable range of humidity is a low range of 30% or more and 65% or less, for example. Therefore, when an application liquid having a high moisture content such as two-liquid mixture gel is applied with a single application needle 24 as well, a more miniature pattern can be formed with high precision. Because humidity controller 103 capable of adjusting the humidity to 80% or more is used, a gas such as air having an extremely high humidity of 90% or more for example can be generated, so that a high humidity in space 102 can be achieved in a short time. In other words, the humidity inside cover 101 can be controlled with good response in a higher humidity range.

If the humidity in space 102 around application unit 4 changes, the diameter of an applied liquid material (application material) on a microarrayer or the like changes, even if other conditions remain the same. As the humidity is lower, more moisture is evaporated from the applied liquid material (application material), and therefore, unintended decrease of the diameter of the applied liquid material (application material) may occur. It is therefore important to use application apparatus 100 in the present embodiment to control the humidity in space 102 with high precision.

Application apparatus 100 including application unit 4 according to the present embodiment is capable of applying not only liquid materials (application materials) for industrial use, but also liquid materials (application materials) provided as a cell-containing liquid including a gelling agent containing cells, for example. In this case, the liquid material (application material) in application material container 21 is a cell-containing liquid, and therefore, many living cells are contained in the liquid material (application material). In this case, if the humidity in space 102 inside cover 101 is low and the applied liquid material (application material) is dried and evaporated easily, cells contained in the material cannot live any more. According to the present embodiment, however, the humidity in space 102 formed by cover 101 and Y-axis worktable 2 can be adjusted to 80% or more, to enable prevention of cell death in the cell-containing liquid due to dryness in space 102.

In the present embodiment, when the liquid material (application material) is a cell-containing liquid containing a gelling agent, cells that can be used to be contained in the liquid material (application material) are not particularly limited. As these cells, for example, any of various primary cells such as fibroblasts, vascular endothelial cells, epidermal cells, smooth muscle cells, cardiomyocytes, gastrointestinal tract cells, neurons, hepatocytes, kidney cells, and pancreatic cells; differentiated cells derived from iPS cells; and various cancer cells can be used. As these cells, unmodified cells can be used. Alternatively, as these cells, cells modified with any of protein, sugar chains, and nucleic acid can also be used. Specifically, as the modified cells, cells coated with a generally known coating agent such as fibronectin, gelatin, laminin, or elastin can be used. As the modified cells, cells coated with a generally known coating method using fibronectin, gelatin, laminin, elastin, or the like can be used.

The cell-containing liquid may contain an extracellular matrix component such as fibronectin, gelatin, collagen, laminin, elastin, or Matrigel. The cell-containing liquid may also contain a cell growth factor such as fibroblast growth factor or platelet-derived growth factor. The cell-containing liquid may also contain an additive such as vascular endothelial cells, lymphatic endothelial cells, and various stein cells. These are included in the cell-containing liquid in order to provide an environment in which the encapsulated cells can stably adhere and grow. The cell-containing liquid may also contain fibrinogen, alginic acid, thermoresponsive polymer, or the like as a gelling agent.

In application apparatus 100, application unit 4 includes application needle 24 capable of supplying a liquid material (application material) to substrate 5 which is a material-to-be-processed, by applying it to substrate 5. The application method using application needle 24 applies the liquid material (application material) to have a significantly smaller diameter relative to the inkjet method or the dispenser method. The applied liquid of a significantly smaller amount is more easily dried. Application apparatus 100 including humidity controller 103 according to the present embodiment is therefore particularly effective for an apparatus based on the application method using application needle 24.

In application apparatus 100, flow inlet 107 is located upward of, i.e., opposite to, Y-axis worktable 2 in the Z direction with respect to application unit 4. Accordingly, humidified gas from flow inlet 107 proceeds downward in space 102, so that the gas can appropriately be supplied to a desired position such as application position of application unit 4.

In application apparatus 100, exhaust outlet 109 that allows gas in space 102 to be discharged into the outside of space 102 is formed in cover 101. In the Y direction which is the second direction, for example, application unit 4 is located away from line LI connecting flow inlet 107 to exhaust outlet 109.

While humidification in space 102 is important, it may not be preferred in some cases to directly blow a large amount of humidified gas against application unit 4. This is for the reason that the moisture in the gas may enter the liquid material (application material) so that the solvent concentration in the applied liquid material (application material) could change. This is also for the reason that the moisture in the gas may adhere to the surface of application needle 24 so that condensation could occur on application needle 24 or application needle 24 could rust. In view of this, the above-described configuration is used so that application unit 4 is not located in the region between flow inlet 107 and exhaust outlet 109. Thus, exposure of application unit 4 to a large amount of humidified gas, due to positioning of application unit 4 in the flow path through which a large amount of humidified gas flows from flow inlet 107, can be avoided. Accordingly, problems such as change of the solvent concentration in the liquid material (application material), and condensation and rusting of application needle 24, for example, can be avoided.

In application apparatus 100, cover 101 has walls, specifically a pair of walls 101A, 101B arranged at respective ends in the X direction which is the third direction. Flow inlet 107 is formed in wall 101B which is one of the pair of walls 101A, 101B. Exhaust outlet 109 is formed in wall 101A which is the other of the pair of walls 101A, 101B, Thus, when application unit 4 is located centrally in space 102 in the X direction, for example, the distance (in the X direction) from application unit 4 to flow inlet 107/exhaust outlet 109 can further be increased. Thus, exposure of application unit 4 to a large amount of humidified gas, due to positioning of application unit 4 in the flow path through which a large amount of humidified gas flows from flow inlet 107, can be avoided. Accordingly, problems such as change of the solvent concentration in the liquid material (application material), and condensation and rusting of application needle 24, for example, can be avoided.

In application apparatus 100, flow inlet 107 and exhaust outlet 109 are formed to occupy the same position in the Y direction which is the second direction. Accordingly, there is a higher possibility that application unit 4 is located away in the second direction from the line connecting flow inlet 107 to exhaust outlet 109. Thus, exposure of application unit 4 to a large amount of humidified gas, due to positioning of application unit 4 in the flow path through which a large amount of humidified gas flows from flow inlet 107, can be avoided. Accordingly, problems such as change of the solvent concentration in the liquid material (application material), and condensation and rusting of application needle 24, for example, can be avoided.

In application apparatus 100, flow inlet 107 and exhaust outlet 109 are formed opposite to each other in the Z direction which is the first direction, with respect to the side opposite to Y-axis worktable 2, i.e., with respect to the upper end, i.e. upper end 4*a*, of application unit 4. Thus, flow inlet 107 is located upward of upper end 4*a* of application unit 4 while exhaust outlet 109 is located downward of upper end 4*a* of application unit 4, so that gas can be supplied to the entire space 102. Thus, difference of the humidity between regions inside cover 101 can be suppressed, and the humidity in the entire space 102 in cover 101 can be made substantially uniform. Accordingly, humidity control precision around application unit 4 can further be improved. As a result, the liquid material (application material) can be applied with a further improved precision.

Application apparatus 100 further includes a pair of fans 111 mounted on cover 101 in such a manner that these fans face each other in at least one of the Y direction which is the second direction and the X direction which is the third direction. Thus, humidified gas supplied into space 102 is blown toward the center of cover 101 while being stirred by fans 111A, 111B. Thus, exposure of application unit 4 to a large amount of humidified gas, due to positioning of application unit 4 in the flow path through which a large amount of humidified gas flows from flow inlet 107, can be avoided. Accordingly, problems such as change of the solvent concentration in the liquid material (application material), and condensation and rusting of application needle 24, for example, can be avoided. Moreover, difference of the humidity between regions inside cover 101 can be suppressed, and the humidity in the entire space 102 inside cover 101 can be made substantially uniform.

In addition, humidity controller 103 of application apparatus 100 may include an ultrasonic oscillation generator, and a micro-water-droplets generator using ultrasonic oscillations to generate micro water droplets having a particle size of 5 μm or less, for example. In this case, micro water droplets adhering to application unit 4 before being evaporated causes rusting or the like. The configuration having fans 111 as described above can be used to control, with good response, the humidity inside cover 101 in a higher humidity range. This is for the reason that humidified gas is stirred by fans 111 so that the humidified gas is diffused quickly. As a result, the workability can be improved.

In application apparatus 100, a pair of fans 111 are located toward Y-axis worktable 2, i.e., downward of flow inlet 107, in the Z direction which is the first direction. Humidified gas supplied from flow inlet 107 into space 102 flows downward and then its flow is controlled by fan 111 to further flow forward in the Y direction in FIG. 18, for example. The gas flowing downward can be controlled so that only an appropriate amount of the gas, not excessive gas, flows toward application unit 4. Thus, appropriate humidity can be supplied to application unit 4 while malfunction due to excessive supply of humidity can be suppressed.

In application apparatus 100, a pair of fans 111 each include surrounding portion 111D and four legs 111E with which surrounding portion 111D is attached to cover 101. Four legs 111E extend from the main surface of surrounding portion 111D in the direction crossing the main surface. Such a structure makes it easier to cause the supplied humidified gas to flow into the gap between the main surface of surrounding portion 111D of fan 111 and the inner wall surface of cover 101 to which the fan is attached. In this way, malfunction such as condensation in a part of the entire region, due to humidified air staying in this part, can be suppressed.

Application apparatus 100 further includes partition 117 located between application unit 4 and flow inlet 107. Partition 117 blocks a part of humidified gas flowing from flow inlet 107 toward application unit 4. Thus, exposure of application unit 4 to a large amount of humidified gas, due to positioning of application unit 4 in the flow path through which a large amount of humidified gas flows from flow inlet 107, can be avoided. Accordingly, problems such as change of the solvent concentration in the liquid material (application material), and condensation and rusting of application needle 24, for example, can be avoided.

Application apparatus 100 in each example of the present embodiment as described above may further include a dehumidifying mechanism. Accordingly, excessive increase of the humidity in space 102 as well as resultant malfunction such as condensation on application unit 4 can be suppressed.

Application apparatus 100 in each example as described above may be configured so that the amount of air blown by fans 111 mounted on inner wall surface 101C, 101D, 101G, 101H of cover 101 is controlled based on the output value of the humidity measured by humidity sensor 113.

Further, the gas supplied into cover 101 of application apparatus 100 in each example as described above may be gas with its temperature adjusted in addition to its humidity. In this case, preferably a temperature sensor is placed in space 102, in addition to humidity sensor 113.

Example 1

Figure 25:
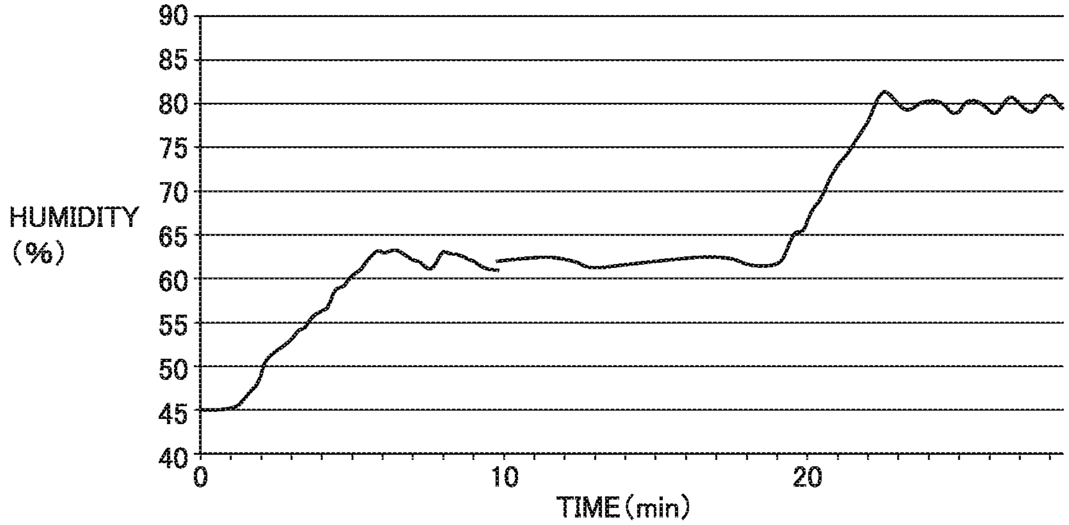
FIG. 25 is a graph showing a result of measuring change, with time, of the humidity in the cover, according to Example 1.

The humidity of space 102 within cover 101 of application apparatus 100 was increased from 45% to 60%, and thereafter increased to 80% by humidity controller 103, and change of the humidity of space 102 was examined. FIG. 25 is a graph showing a result of measuring the change, with time, of the humidity within cover 101 according to Example 1. The horizontal axis in FIG. 25 represents the time elapsed from the start of the humidifying process within cover 101. The vertical axis in FIG. 25 represents the result of measuring the humidity within cover 101. Referring to FIG. 25, it took about four minutes to increase the humidity of space 102 from 45% to 60%. It took about four minutes to increase the humidity of space 102 from 60% to 80%. Thus, application apparatus 100 could increase the humidity of space 102 in a significantly short time. In other words, the work efficiency can be enhanced by using application apparatus 100.

Example 2

The application diameter, as seen in plan view, of a pattern of a liquid material (application material) applied from application needle 24, when the humidity of space 102 in application apparatus 100 was changed, was measured. The circular cross section of the tip of used application needle 24 had a diameter of 0.8 mm, and the material was applied once. The standby time of application needle 24 in application material container 21 was 1020 ms, and no standby time was provided after application needle 24 was descended. The applied liquid material (application material) was 2.5 mg/mL of a hyaluronic acid solution. The height (thickness) to which the liquid material (application material) was applied per application was constant. Under the same humidity condition, the same test was conducted five times, and the result of measurement for each test is plotted in the following graph.

Figure 26:
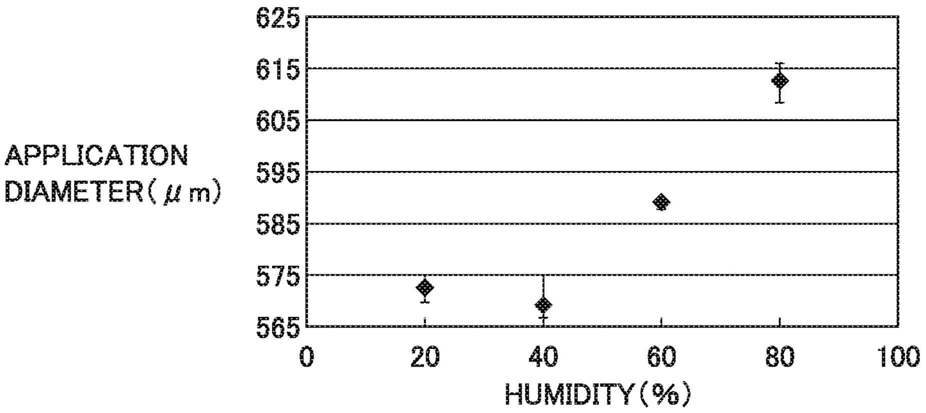
FIG. 26 is a graph showing a result of measuring the application diameter under each humidity condition, according to Example 2.

FIG. 26 is a graph showing a result of measuring the application diameter under an environment of each humidity according to Example 2. The horizontal axis in FIG. 26 represents the humidity of space 102. The vertical axis in FIG. 26 represents the result of measuring the application diameter of the liquid material (application material) applied under each humidity condition. The test was conducted in four different humidity environments in which the humidity was 20%, 40%, 60%, and 80%, respectively. Referring to FIG. 26, the application diameter tended to increase with increase of the humidity. The humidity change from 20% to 80% caused the application diameter to increase by approximately 40 μm. Meanwhile, between applied patterns under the same humidity condition, the difference in application diameter was small. At any humidity, the difference in application diameter was 10 μm or less. The time required for the applied liquid to dry tended to be longer as the humidity was higher, which is not shown in graph.

As seen from the above, application by application apparatus 100 having humidity controller 103 while controlling the humidity enables a liquid material (application material) having a high moisture content such as gelling agent to be applied with a constant application diameter with no variation, without changing the application conditions during the application. When the humidity is changed, the application diameter changes considerably even if other conditions are the same, and therefore, it is important to control the humidity by means of humidity controller 103.

Referring to FIG. 26, the application diameter increases with increase of the humidity. This is for the reason that the amount of the liquid material (application material) adhering to the tip of application needle 24 changes. Specifically, under a low humidity condition, a large amount of moisture contained in the liquid material (application material) was evaporated, and thus the application diameter decreased. Under a high humidity condition, evaporation of the moisture contained in the liquid material (application material) was suppressed, and thus the application diameter increased. Moreover, if the application liquid contains a large amount of moisture, evaporation of the moisture causes increase of the concentration and the viscosity of the applied liquid, and thus causes a significant change of the application diameter depending on the application conditions. Such a change has a significant influence such as pattern variation. In view of this, humidity controller 103 is used to control the humidity so that a pattern of a desired application diameter can be applied stably by controlling the humidity by humidity controller 103.

When the liquid material (application material) is a cell-containing liquid containing a gelling agent and the humidity is 80% in space 102 in FIG. 26, it is possible to achieve not only increase of the application diameter but also maintenance of the state where cells contained in the liquid material (application material) are living.

The characteristics described in connection with each example included in the embodiments as described above may be applied in an appropriate combination falling within a range without inconsistency.

It should be construed that the embodiments disclosed herein are given by way of illustration in all respects, not by way of limitation. It is intended that the scope of the present disclosure is defined by claims, not by the description above, and encompasses all modifications and variations equivalent in meaning and scope to the claims.

REFERENCE SIGNS LIST

1 X axis worktable; 2 Y axis worktable; 3 Z axis worktable; 4 application unit; 5 substrate; 6 observation optical system; 7 CCD camera; 8 operation panel; 9 monitor; 10 control computer; 20 application needle holder; 21 application material container; 24 application needle; 41 servo motor; 43 cam; 44 bearing; 45 cam coupling plate; 46 movable portion; 47 application needle holder fixing portion; 48 application needle holder housing; 49 linear guide; 50 spring; 51, 52 fixing pin; 61 cam surface; 62 upper end flat region; 63 lower end flat region; 70 application material; 72 through hole; 80 controller; 90 drive unit; 100 application apparatus; 101 cover; 101A, 101B, 101E, 101F wall; 101C, 101D, 101G, 101H inner wall surface; 102 space; 103 humidity controller; 105 gas passage; 107 flow inlet; 109 exhaust outlet; 111, 111A, 111B fan; 111C rotary vane; 111D surrounding portion; 111E leg; 113 humidity sensor; 115 support; 117 partition; 119 partition member.

The invention claimed is:

1. An application apparatus comprising:

an application needle configured to apply, to a target, an application material having viscosity changing under shear;

a drive unit configured to move the application needle up and down, the drive unit comprising a servo motor;

a controller configured to receive i) a type of the application material and ii) an application diameter representing a desired size of a film to be formed at a portion of the target, the portion of the target being a portion where the application material is to be applied, and control the drive unit to move the application needle such that the application material is sheared at a shear speed corresponding to i) the type of the application material and ii) the application diameter; and a container that holds the application material and has, in its bottom facing the target, a through hole allowing the application needle to protrude from the through hole, wherein the controller is configured to control the drive unit to move the application needle such that shear is applied to the application material at the shear speed when the application needle passes through the through hole, and wherein based on i) the type of the application material, ii) the application diameter, and iii) a distance between the application needle and an outer wall of the through hole when the application needle protrudes through the through hole, the controller is configured to determine a moving speed of the application needle in a vertically downward direction, and control the application needle such that the application needle passes through the through hole at the determined moving speed.

2. The application apparatus according to claim 1, wherein based on i) the type of the application material and ii) the application diameter, the controller is configured to determine a moving speed of the application needle in a vertically downward direction, and control the application needle such that the application needle passes through the through hole at the determined moving speed.

3. The application apparatus according to claim 1, wherein the controller is configured to hold a table defining the moving speed associated with i) the type of the application material, ii) the application diameter, and iii) the distance between the application needle and the outer wall of the through hole, and determine the moving speed by referring to the table.

4. The application apparatus according to claim 3, wherein the application material is any of a pseudoplastic fluid, a dilatant fluid, and a Bingham fluid.

5. The application apparatus according to claim 4, wherein for the same distance between the application needle and the outer wall of the through hole and the type of the application material that is the pseudoplastic fluid, the table defines the moving speed to decrease as the application diameter increases.

6. The application apparatus according to claim 4, wherein for the same distance between the application needle and the outer wall of the through hole and the type of the application material that is the dilatant fluid, the table defines the moving speed to increase as the application diameter increases.

7. The application apparatus according to claim 4, wherein for the same distance between the application needle and the outer wall of the through hole and the type of the application material that is the Bingham fluid, the table defines the moving speed to decrease as the application diameter increases when the application diameter is less than or equal to a predetermined value, and defines the moving speed as being constant regardless of the application diameter when the application diameter is more than the predetermined value.

8. The application apparatus according to claim 4, wherein for the same type of the application material and for the same application diameter, the table defines the moving speed to decrease as the distance between the application needle and the outer wall of the through hole increases.

9. The application apparatus according to claim 3, wherein the application material is a cell-containing solution.

10. The application apparatus according to claim 9, wherein, for the same distance between the application needle and the outer wall of the through hole, the table defines the moving speed to decrease as the application diameter increases.

11. The application apparatus according to claim 1, further comprising:

an application unit configured to include the application needle and the drive unit and supply the application material to a target material-to-be-processed mounted on a worktable;

a cover that spreads over the application unit as seen in a first direction;

a humidity controller configured to control a humidity in a space formed by the cover and the worktable; and an air passage configured to allow gas with controlled humidity to be supplied from the humidity controller into the space through a flow inlet formed in the cover, wherein the cover includes a wall, and the wall surrounds the application unit in a second direction orthogonal to the first direction and in a third direction orthogonal to the first direction and the second direction, and the application apparatus is configured to adjust the humidity in the space to 80% or more.

12. The application apparatus according to claim 11, further comprising a humidity sensor configured to measure the humidity in the space and sends a result of measuring the humidity to the humidity controller.

13. The application apparatus according to claim 11, wherein the flow inlet is located opposite, in the first direction, to the worktable with respect to the application unit.

14. The application apparatus according to claim 11, wherein an exhaust outlet is formed in the cover to allow gas in the space to be discharged into an outside of the space, and the application unit is located, in the second direction, away from a line connecting the flow inlet to the exhaust outlet.

15. The application apparatus according to claim 14, wherein the wall of the cover includes a pair of walls located at respective ends in the third direction, the flow inlet is formed in one of the pair of walls, and the exhaust outlet is formed in another of the pair of walls.

16. The application apparatus according to claim 14, wherein the flow inlet and the exhaust outlet are formed to occupy the same position in the second direction.

17. The application apparatus according to claim 15, wherein in the first direction, the flow inlet and the exhaust outlet are formed opposite to each other with respect to an end of the application unit, the end of the application unit being located opposite to the worktable.

18. The application apparatus according to claim 11, further comprising a pair of fans placed on the cover, the fans being opposite to each other in at least one of the second direction and the third direction.

19. The application apparatus according to claim 18, wherein the pair of fans are located away from the flow inlet toward the worktable in the first direction.

20. The application apparatus according to claim 18, wherein the pair of fans each include a surrounding portion and four legs with which the surrounding portion is attached to the cover, and the four legs extend from a main surface of the surrounding portion in a direction crossing the main surface.

21. The application apparatus according to claim 11, further comprising a partition located between the application unit and the flow inlet.

22. The application apparatus according to claim 11, wherein the application material is a cell-containing liquid containing a gelling agent.

* * * * *